United States Patent
McQuillen et al.

(10) Patent No.: US 10,247,140 B2
(45) Date of Patent: Apr. 2, 2019

(54) METHODS AND SYSTEM FOR ADJUSTING ENGINE WATER INJECTION

(71) Applicant: Ford Global Technologies, LLC, Dearborn, MI (US)

(72) Inventors: Michael McQuillen, Warren, MI (US); Daniel A. Makled, Dearborn, MI (US); Mohannad Hakeem, Dearborn, MI (US); Gopichandra Surnilla, West Bloomfield, MI (US); Joseph Norman Ulrey, Dearborn, MI (US); Michael Howard Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/384,204

(22) Filed: Dec. 19, 2016

(65) Prior Publication Data
US 2018/0171936 A1 Jun. 21, 2018

(51) Int. Cl.
*F02M 25/022* (2006.01)
*F02D 41/00* (2006.01)
*F02M 35/10* (2006.01)

(52) U.S. Cl.
CPC ..... *F02M 25/0227* (2013.01); *F02D 41/0065* (2013.01); *F02M 35/1038* (2013.01)

(58) Field of Classification Search
CPC ............ F02M 25/0227; F02M 35/1038; F02D 41/0065
See application file for complete search history.

(56) References Cited

U.S. PATENT DOCUMENTS

| | | |
|---|---|---|
| 3,990,408 A | 11/1976 | Kroll |
| 4,461,245 A | 7/1984 | Vinokur |
| 4,558,665 A | 12/1985 | Sandberg et al. |
| 4,571,151 A | 2/1986 | Paul |
| 2008/0202454 A1 | 8/2008 | Pirault |
| 2011/0132334 A1* | 6/2011 | Lippa ..................... F02B 37/18 123/556 |
| 2012/0260886 A1* | 10/2012 | Mulye .................... F02B 47/02 123/25 C |
| 2013/0035841 A1* | 2/2013 | Glugla .................... F02D 41/22 701/105 |
| 2013/0206100 A1 | 8/2013 | Yacoub |
| 2013/0338903 A1* | 12/2013 | Pursifull ............... F02D 19/061 701/103 |

(Continued)

OTHER PUBLICATIONS

US2015-0122226A—Derwent.*

(Continued)

*Primary Examiner* — Jacob Amick
*Assistant Examiner* — Charles Brauch
(74) *Attorney, Agent, or Firm* — Julia Voutyras; McCoy Russell LLP

(57) ABSTRACT

Methods and systems are provided for water injection at an intake port of an engine toward or away from intake valves in response to engine operating conditions. In one example, a method may include port injecting water away from an intake valve in response to engine knock and port injecting water towards an intake valve in response to engine dilution demand. Further, the method may include adjusting an amount of water injected based on one or more of a change in manifold temperature and a change in exhaust oxygen level.

18 Claims, 8 Drawing Sheets

(56) References Cited

U.S. PATENT DOCUMENTS

| | | | | |
|---|---|---|---|---|
| 2014/0121951 A1* | 5/2014 | Bidner | ................... | F02D 29/02 |
| | | | | 701/112 |
| 2015/0114346 A1* | 4/2015 | Surnilla | .............. | F02D 41/0007 |
| | | | | 123/349 |
| 2015/0122226 A1* | 5/2015 | Kamada | .................. | F02D 13/02 |
| | | | | 123/48 R |

OTHER PUBLICATIONS

Voltage Signal Systems; 2015; All About Circuits; Chapter 9; 1-4.*
Wayback Machine to Date Voltage Signal Systems.*
Hakeem, Mohannad, et al., "Methods and System for Adjusting Engine Operation Based on Evaporated and Condensed Portions of Water Injected at an Engine," U.S. Appl. No. 15/226,485, filed Aug. 2, 2016, 52 pages.
Hakeem, Mohannad, et al., "Methods and System for Selecting a Location for Water Injection in an Engine," U.S. Appl. No. 15/226,548, filed Aug. 2, 2016, 52 pages.
Hakeem, Mohannad, et al., "Methods and System for Injecting Water at Different Groups of Cylinders of an Engine," U.S. Appl. No. 15/226,615, filed Aug. 2, 2016, 54 pages.
McQuillen, Michael, et al., "Method and System for Engine Water Injection," U.S. Appl. No. 15/384,150, filed Dec. 19, 2016, 48 pages.
McQuillen, Michael, et al., "Method and System for Pulsed Engine Water Injection," U.S. Appl. No. 15/384,172, filed Dec. 19, 2016, 49 pages.
McQuillen, Michael, et al., "Method and System for Engine Water Injection," U.S. Appl. No. 15/384,188, filed Dec. 19, 2016, 50 pages.
McQuillen, Michael, et al., "Method and System for Adjusting Engine Water Injection," U.S. Appl. No. 15/384,223, filed Dec. 19, 2016, 77 pages.
Shelby, Michael Howard, et al., "Method and System for Engine Water Injection," U.S. Appl. No. 15/384,243, filed Dec. 19, 2016, 55 pages.
Hakeem, Mohannad, et al., "Method and System for Water Injection Control," U.S. Appl. No. 15/384,253, filed Dec. 19, 2016, 45 pages.

* cited by examiner

METHODS AND SYSTEM FOR ADJUSTING ENGINE WATER INJECTION

FIELD

The present description relates generally to methods and systems for injecting water at an engine based on a dilution demand and cooling demand of the engine.

BACKGROUND/SUMMARY

Internal combustion engines may include water injection systems that inject water from a storage tank into a plurality of locations, including an intake manifold, upstream of engine cylinders, or directly into engine cylinders. Injecting water into the engine intake air may increase fuel economy and engine performance, as well as decrease engine emissions. When water is injected into the engine intake or cylinders, heat is transferred from the intake air and/or engine components to the water. This heat transfer leads to evaporation, which results in cooling. Injecting water into the intake air (e.g., in the intake manifold, ports, etc.) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, and decreased exhaust temperature. As a result, fuel efficiency is increased. Additionally, greater volumetric efficiency may lead to increased torque. Furthermore, lowered combustion temperature with water injection may reduce NOx, while a more efficient fuel mixture may reduce carbon monoxide and hydrocarbon emissions.

As explained above, water may be injected into different locations, including the intake manifold, intake ports of engine cylinders, or directly into engine cylinders. However, the inventors have recognized that water injection benefits may be limited based on the location of the water injection as well as the engine operating conditions at the time of the water injection. As an example, manifold water injection may be used to provide charge cooling. However the charge cooling benefit may be limited when the ambient humidity is elevated. As another example, manifold water injection may be used to provide charge dilution. However, the injected water may puddle if the water does not evaporate rapidly enough, leading to potential misfires. If the water injection benefits are not sufficiently leveraged, fuel economy and engine stability may be degraded.

In one example, the issues described above may be addressed by a method for an engine comprising, during a first condition, responsive to an engine dilution demand, port injecting water towards a closed intake valve; and during a second condition, responsive to engine knock, port injecting water away from an open intake valve. In this way, port water injection may be utilized both for increasing engine dilution to decrease pumping losses and increase charge air cooling to reduce engine knock and increase engine efficiency by adjusting the direction and timing of the injection.

As one example, an engine may be configured with a first set of port injectors angled towards the intake valve, and a second set of port injectors angled away from the intake valve (e.g., towards the intake manifold). During conditions when engine combustion is knock limited, such as at high loads, water may be injected via the second set of port injectors at a timing when intake valves are open. This results in a larger portion of the water being injected in the liquid form, improving the charge cooling effect of the injection. In comparison, during conditions when engine combustion is dilution limited, such as at low loads, water may be injected via the first set of port injectors at a timing when intake valves are about to be closed, and while the valve surface is hot. This results in a flash vaporization of the water when it impinges the surface. Consequently, a larger portion of the water injected will rapidly change into vapor form, improving the charge diluting effect of the injection. In addition, the water injection via the first set of injectors may be sensed via dilution (or concentration) sensors (e.g. IAO2) while the water injection via the second set of injectors may be sensed via temperature sensors.

In this way, distinct water injection benefits may be provided in an engine at a given water injection location by varying a direction and timing of the injection. The technical effect of port injecting water on the hot surface of a closed intake valve, such as at BDC of an intake stroke, in the same direction as air flow, is that the injected water can be substantially immediately evaporated. As a result, a charge dilution effect of the water injection can be increased while the charge cooling effect of the water injection is decreased. By port injecting the water when the valve surface is hot, water puddling is reduced, reducing the risk of water induced misfires. The technical effect of port injecting water away from an open intake valve, in the opposite direction of air flow, is that the turbulence from the high speed of airflow can be advantageously used to improve atomization of the injected water into the air before the air-water mixture is delivered to the engine cylinder. As a result, a charge cooling effect of the water injection can be increased while the charge dilution effect of the water injection is decreased. By selecting a water injection sensing mode based on the water injection benefit being leveraged (e.g., charge cooling or dilution), a water injection error may be more reliably determined and compensated for. Overall, water injection benefits may be extended over a wider range of engine operation, improving engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
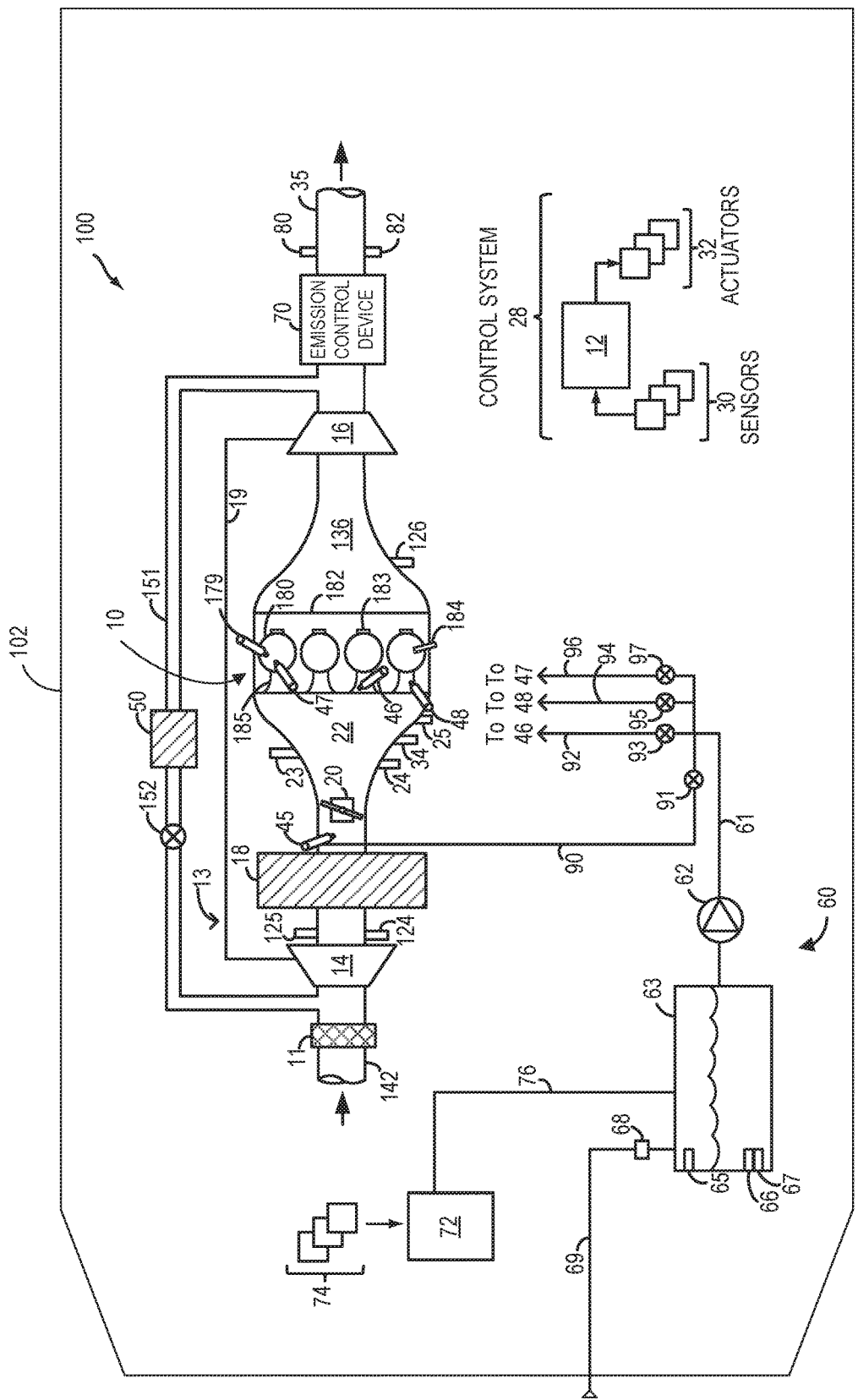
FIG. 1 shows a schematic diagram of an engine system, including a water injection system.
Figure 7:
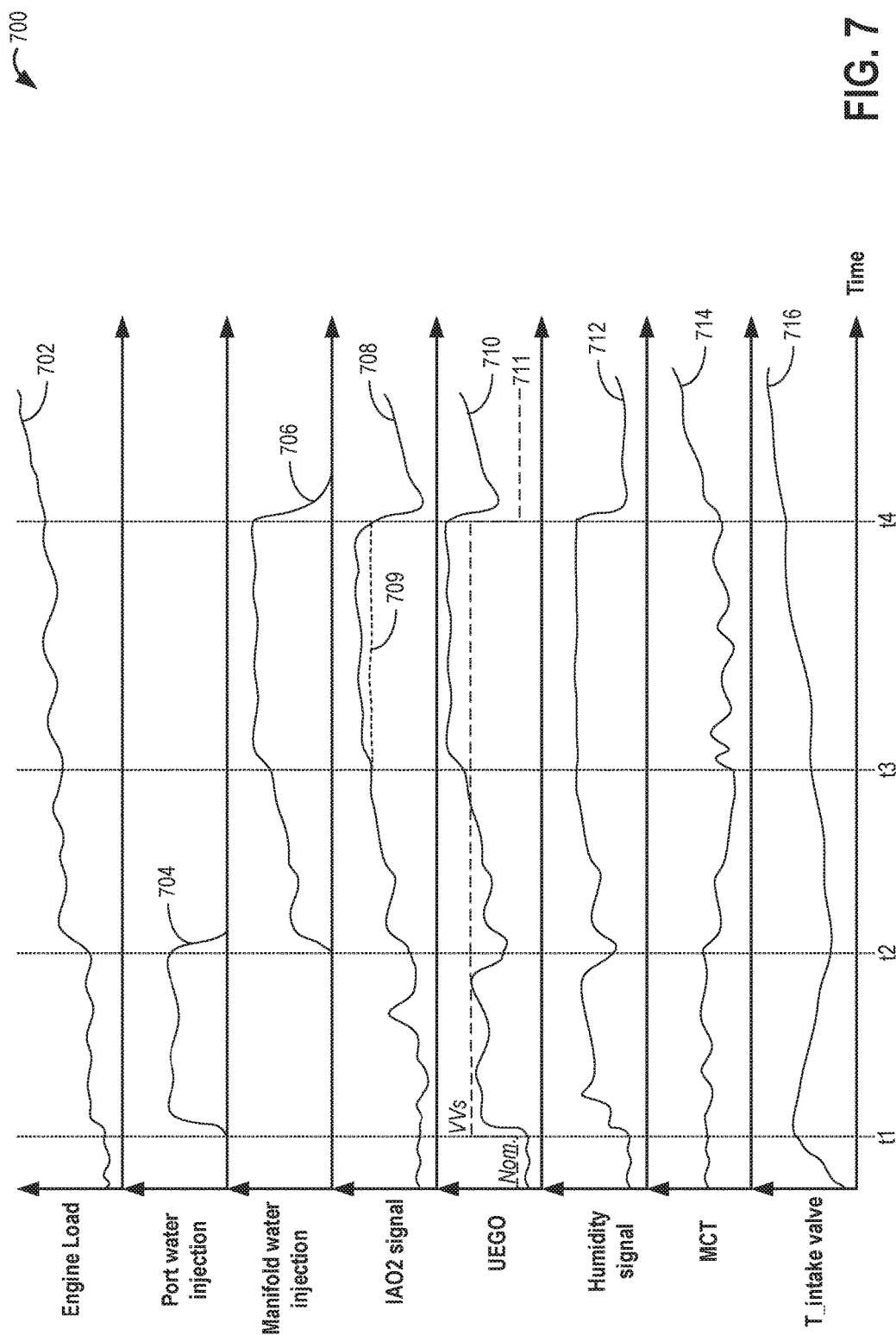
FIG. 7 shows example water injection adjustments for dilution control and corresponding water sensing modalities.
Figure 8:
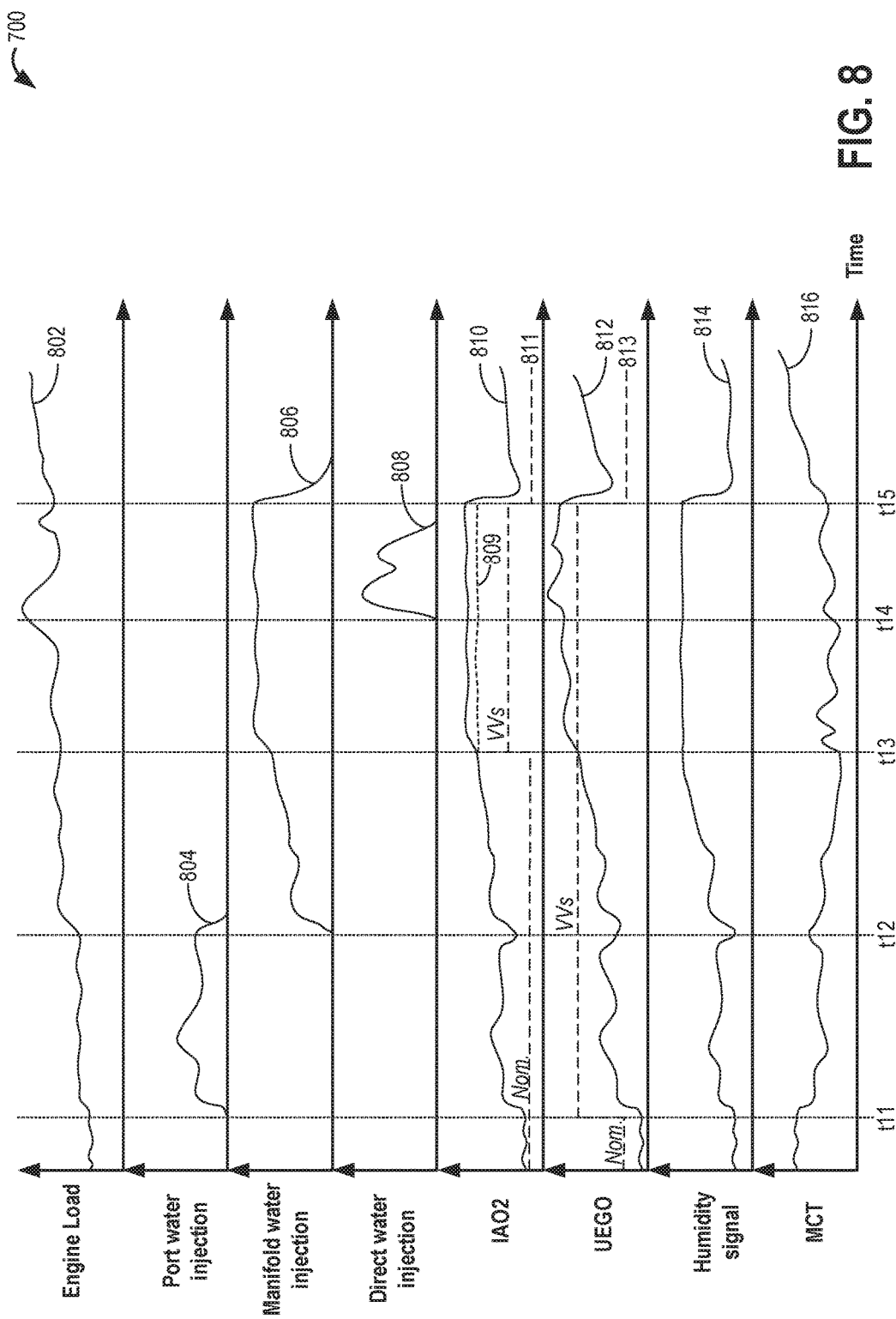
FIG. 8 shows example water injection adjustments for knock control and corresponding water sensing modalities.

The following description relates to systems and methods for injecting water at a selected location in an engine based on engine operating conditions and adjusting water injection parameters, as well as engine operating parameters, based on a measured water injection error. A schematic depiction of an example vehicle system, including a water injection system, is shown in FIG. 1. Water injectors may be located in an engine intake manifold, in intake ports of the engine cylinders oriented toward intake valves, in intake ports oriented away from intake valves, and/or directly coupled to each individual cylinder. An engine controller may be configured to perform a control routine, such as the example routines of FIGS. 2-3, to select one or more water injection locations based on engine operating conditions in order to provide charge air cooling, engine component cooling, and/or engine dilution benefits. The controller may refer a map, such as the example map of FIG. 5, to identify regions of engine operation where water injection can be leveraged for improving engine efficiency. The controller may also refer to the example map of FIG. 6 to identify a port water injection timing that provides dilution control or knock control. The controller may further select a water injection sensing mode based on the water injector selection. FIGS. 4, 7, and 8 graphically depict examples of adjusting of the water injection amount and location based on engine operating conditions and estimating a water injection error by selecting a water sensing mode based on the water injector selection. In this way, water injection errors may be determined more accurately and compensated for appropriately.

Turning to the figures, FIG. 1 shows an embodiment of a water injection system 60 and an engine system 100, in a motor vehicle 102, illustrated schematically. In the depicted embodiment, engine 10 is a boosted engine coupled to a turbocharger 13 including a compressor 14 driven by a turbine 16. Specifically, fresh air is introduced along intake passage 142 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve (e.g., intake throttle) 20. The CAC may be an air-to-air or air-to-coolant heat exchanger, for example. Throttle valve 20 is coupled to engine intake manifold 22. From the compressor 14, the hot compressed air charge enters the inlet of the CAC 18, cools as it travels through the CAC, and then exits to pass through the throttle valve 20 to the intake manifold 22. In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers or cylinders 180 through a series of intake valves (not shown) and intake runners (e.g., intake ports) 185. As shown in FIG. 1, the intake manifold 22 is arranged upstream of all combustion chambers 180 of engine 10. Sensors such as manifold charge temperature (MCT) sensor 23 and air charge temperature sensor (ACT) 125 may be included to determine the temperature of intake air at the respective locations in the intake passage. In some examples, the MCT and the ACT sensors may be thermistors and the output of the thermistors may be used to determine the intake air temperature in the passage 142. The MCT sensor 23 may be positioned between the throttle 20 and the intake valves of the combustion chambers 180. As described further below with regard to FIG. 3, before and after injection of water into the intake manifold responsive to a charge cooling request, an output of MCT sensor 33 may be monitored. Since the release of water into the intake manifold causes charge cooling, an amount of water actually released or delivered into the engine intake manifold may be learned as a function of the change in MCT following the commanding of a water injection. As such, the amount of water commanded to be released may be different from the amount of water that is actually released due to issues such as water injector errors, a plugged or contaminated water injection nozzle, a water injector solenoid fault, a water injector valve fault, temperature and/or pressure effects on water injection, etc. In addition, the amount of water released may be different from the amount of water that is dispersed or vaporized in the engine. As elaborated herein, the amount of water vaporized and contributing to charge dilution may be determined based on the output of an intake oxygen sensor 34 coupled to the engine intake manifold, downstream of the intake throttle. The ACT sensor 125 may be located upstream of the CAC 18 as shown, however, in alternate embodiments, the ACT sensor 125 may be positioned upstream of compressor 14. The air temperature may be further used in conjunction with an engine coolant temperature (ECT) to compute the amount of fuel that is delivered to the engine, for example. Further, additional temperature sensors, such as engine coolant temperature (ECT) sensor 25, may be included to determine whether an intake manifold surface temperature and/or an intake valve surface temperature is high enough for port water injection onto the manifold/valve surface, as described further below with regard to FIG. 3. Each combustion chamber may further include a knock sensor 183 for identifying abnormal combustion events. Outputs of the knock sensors of each combustion chamber 180 may be used to detect maldistribution of water to each combustion chamber 180, where the water is injected upstream of all the combustion chambers 180. In alternate embodiments, one or more knock sensors 183 may be coupled to selected locations of the engine block.

The combustion chambers are further coupled to exhaust manifold 136 via a series of exhaust valves (not shown). The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Furthermore, combustion chamber 180 draws in water and/or water vapor, which may be injected into the engine intake or the combustion chambers 180 themselves by a plurality of water injectors 45-48. In the depicted embodiment, the water injection system is configured to inject water downstream of the throttle and into the intake manifold 22 via injector 45, into one or more intake runners (e.g., ports) 185 via injector 48, away from one or more intake runners (e.g., ports) 185 via injector 46, and directly into one or more combustion chambers 180 via injector 47. In another embodiment, the water injection system may be configured to inject water at additional locations. For example, the water injection system may be configured to inject water upstream of the throttle 20. In the depicted embodiment, injector 48 is arranged in the intake runners such that the injector may be angled toward and facing the intake valve of the cylinder which the intake runner is attached to. As a result, injector 48 may inject water directly onto the intake valve (e.g., while the intake valve is closed). As described further below with regard to FIG. 3, this injector arrangement may result in fast evaporation of the injected water and increase the dilution benefit of using the water vapor as EGR to reduce pumping losses. Conversely, injector 46 may be angled away from the intake valve and be arranged to inject water against the intake air flow direction through the intake runner so that the dispersed water mixed with the air can be directed towards an open intake valve. As a result, more of the injected water may be entrained into the air stream, thereby increasing the cooling benefit.

Though only one representative injector 46, injector 47, and injector 48 are shown in FIG. 1, each combustion chamber 180 and intake runner 185 may include its own injector. In alternate embodiments, a water injection system may include water injectors positioned at one or more of these positions. For example, an engine may include only water injector 45, in one embodiment. In another embodiment, an engine may include each of water injector 45, water injectors 46 and 48 (one of each at each intake runner), and water injectors 47 (one at each combustion chamber). Water may be delivered to water injectors 45-48 by the water injection system 60, as described further below.

In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped from downstream of turbine 16. The EGR valve 152 may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and increased performance. In other embodiments, the EGR system may be a high pressure EGR system with EGR passage 151 connecting from upstream of the turbine 16 to downstream of the compressor 14. In some embodiments, the MCT sensor 23 may be positioned to determine the manifold charge temperature, and may include air and exhaust recirculated through the EGR passage 151.

Intake gas oxygen sensor 34 is configured to provide an estimate regarding the oxygen content of fresh air received in the intake manifold. In addition, when EGR is flowing, a change in oxygen concentration at the sensor may be used to infer an EGR amount and used for accurate EGR flow control. In the depicted example, oxygen sensor 34 is positioned downstream of throttle 20 and downstream of charge air cooler 118. However, in alternate embodiments, the oxygen sensor may be positioned upstream of the throttle. Intake oxygen sensor 34 may be used for estimating an intake oxygen concentration and inferring an amount of EGR flow through the engine based on a change in the intake oxygen concentration upon opening of the EGR valve 152. Likewise, intake oxygen sensor 34 may be used for estimating an intake oxygen concentration and inferring an engine dilution or a change in intake humidity based on a change in the intake oxygen concentration following an intake manifold water injection.

Specifically, a change in the output of the sensor upon opening the EGR valve or upon injecting water into the intake manifold is compared to a reference point where the sensor is operating with no EGR or no water injection (the zero point). Based on the change (e.g., decrease) in oxygen amount from the time of operating with no EGR or no water injection, an EGR flow or water flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR or water relative to sensor output in the absence of EGR or water (the zero point). Based on a deviation of the estimated EGR flow from the expected (or target) EGR flow, further EGR control may be performed. Likewise, as elaborated with reference to FIG. 3, based on a deviation of the estimated engine dilution or humidity from an expected engine dilution or humidity following a water injection, further water injection control may be performed.

In a similar manner, exhaust gas oxygen sensor 126 is configured to provide an estimate regarding the oxygen content of exhaust gas received in the intake manifold which may vary with combustion air-fuel ratio, fuel alcohol content, as well as ambient humidity. As elaborated with reference to FIG. 3, based on a deviation of the estimated exhaust oxygen content from an expected exhaust oxygen content when modulating a reference voltage of the sensor following a water injection, further water injection control may be performed.

It will be appreciated that each of the intake oxygen sensor 34 and UEGO sensor 126 may be operated in various modes based on the engine operating conditions and further based on the nature of the estimation being performed by the sensor. For example, during engine fueling conditions when dilution/EGR estimation is required, the intake oxygen sensor may be operated in a nominal mode with a (fixed) reference voltage applied to the sensor, the reference voltage maintained during the sensing. During engine fueling conditions when exhaust air-fuel ratio estimation is required, the exhaust oxygen sensor may be operated in a nominal mode with a (fixed) reference voltage applied to the sensor, the reference voltage maintained during the sensing. In one example, the reference voltage may be 450 mV. During other conditions, such as during engine non-fueling conditions (e.g., during a DFSO), when ambient humidity (in the intake aircharge) estimation is required, the intake oxygen sensor may be operated in a variable voltage mode with the reference voltage applied to the sensor modulated. In still another example, the sensor may be operated in the variable voltage mode when EGR or dilution estimation is performed while fuel vapor purge (from a fuel system canister) or positive crankcase ventilation (of the engine crankcase) is enabled. Likewise, during conditions when exhaust dilution estimation is required following a water injection, the UEGO sensor may be operated in the variable voltage mode. Therein, the reference voltage of the oxygen sensor is modulated between the nominal reference voltage of 450 mV and a higher reference voltage of 800 mV (or 950 mV). By changing the intake oxygen sensor's reference voltage, or Nernst voltage, the sensor goes from reacting hydrocarbons with ambient oxygen at the sensor to dissociating the products of the reaction (water and carbon dioxide).

The water injection system 60 includes a water storage tank 63, a water pump 62, a collection system 72, and a water filling passage 69. In embodiments that include multiple injectors, water passage 61 may contain one or more valves to select between different water injectors. For example, as shown in FIG. 1, water stored in water tank 63 is delivered to water injectors 45-48 via a common water passage 61 that branches to water passages 90, 92, 94, and 96. In the depicted embodiment, water from water passage 61 may be diverted through one or more of valve 91 and passage 90 to deliver water to injector 45, through valve 93 and passage 92 to deliver water to injector 46, through valve 95 and passage 94 to deliver water to injector 48, and/or through valve 97 and passage 96 to deliver water to injector 47. Additionally, embodiments that include multiple injectors may include a plurality of temperature sensors 25 proximate to each injector to determine engine temperature at one or more water injectors. Water pump 62 may be operated by a controller 12 to provide water to water injectors 45-48 via passage 61. In an alternate embodiment, the water injection system 60 may include multiple water pumps. For example, the water injection system 60 may include a first water pump 62 to pump water to a subset of injectors (such as injectors 45) and a second water pump (not shown) to pump water to another subset of injectors (such as injectors 46, 47, and/or 48). In this example, the second water pump may be a higher pressure water pump and the first water pump may be a relatively lower pressure water pump. In addition, the injection system may comprise a self-pressurized piston pump which can perform both high pressure pumping and injection. For example, one or more of the injectors may include or be coupled to a self-pressurized piston pump.

Water storage tank 63 may include a water level sensor 65, a water quality sensor 66, and a water temperature sensor 67, which may relay information to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The water quality sensor 66 may detect whether the water in water storage tank 63 is suitable for injection. As one example, water quality sensor 66 may be a conductivity sensor. The level of water stored in water tank 63, as identified by water level sensor 65, may be communicated to the vehicle operator and/or used to adjust engine operation. For example, a water gauge or indication on a vehicle instrument panel (not shown) may be used to communicate the level of water. In another example, the level of water in water tank 63 may be used to determine whether sufficient water for injection is available, as described below with reference to FIG. 2. In the depicted embodiment, water storage tank 63 may be manually refilled via water filling passage 69 and/or refilled automatically by the collection system 72 via water tank filling passage 76. Collection system 72 may be coupled to one or more components 74 that refill the water storage tank with condensate collected from various engine or vehicle systems. In one example, collection system 72 may be coupled with an EGR system to collect water condensed from exhaust passing through the EGR system. In another example, collection system 72 may be coupled with an air conditioning system. Manual filling passage 69 may be fluidically coupled to a filter 68, which may remove small impurities contained in the water that could potentially damage engine components.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as for sensing transmission gear position, gas pedal input (e.g., pedal position), brake input, transmission selector position, vehicle speed, engine speed, mass airflow through the engine, boost pressure, ambient temperature, ambient humidity, intake air temperature, fan speed, etc.), cooling system sensors (such as an ECT sensor, and sensors for sensing fan speed, passenger compartment temperature, ambient humidity, etc.), CAC 18 sensors (such as CAC inlet air temperature sensor, ACT sensor 125, CAC outlet air temperature sensor, MCT sensor 23, etc.), knock sensors 183 for determining ignition of end gases and/or water distribution among cylinders, water injection system sensors (such as water level sensor 65, water quality sensor 66, and water temperature sensor 67), exhaust pressure and temperature sensors 80, 82, and others. Furthermore, controller 12 may communicate with various actuators 32, which may include engine actuators (such as fuel injectors, an electronically controlled intake air throttle plate, spark plugs, the various water injectors, wastegate, EGR valve, etc.). In some examples, the storage medium may be programmed with computer readable data representing instructions executable by the processor for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, injecting water to the engine may include adjusting an actuator of injector 45, injector 46, injector 47, and/or injector 48 to inject water and adjusting water injection may include adjusting an amount or timing of water injected via adjustments to a duty cycle of the injector. In another example, adjusting spark timing based on water injection estimates (as described further below) may include adjusting an ionization current and a discharge timing of a spark plug 184.

In this way, the system of FIG. 1 presents an example system that may be used to inject water at one or more locations in an engine intake or cylinders of an engine. As introduced above, water injection may be used to reduce a temperature of the intake air entering engine cylinders and thereby reduce knock and increase volumetric efficiency of the engine. Additionally, injecting water may be used to increase engine dilution and thereby reduce engine pumping losses. As explained above, water may be injected into the engine at different locations, including the intake manifold (upstream of all engine cylinders), manifolds of groups of cylinders (upstream of a group of cylinders, such as in a V-engine), intake runners or ports of engine cylinders (into and away from an intake valve), or directly into engine cylinders. Under different engine operating conditions, such as different engine load and/or speed conditions, it may be advantageous to inject water at one location over another to achieve increased charge air cooling or dilution. For example, manifold or port injection (from injectors angled away from intake valves) may provide increased cooling to the engine cylinders and ports, whereas port inject (from injectors that inject onto intake valves) may provide increased dilution.

Figure 5:
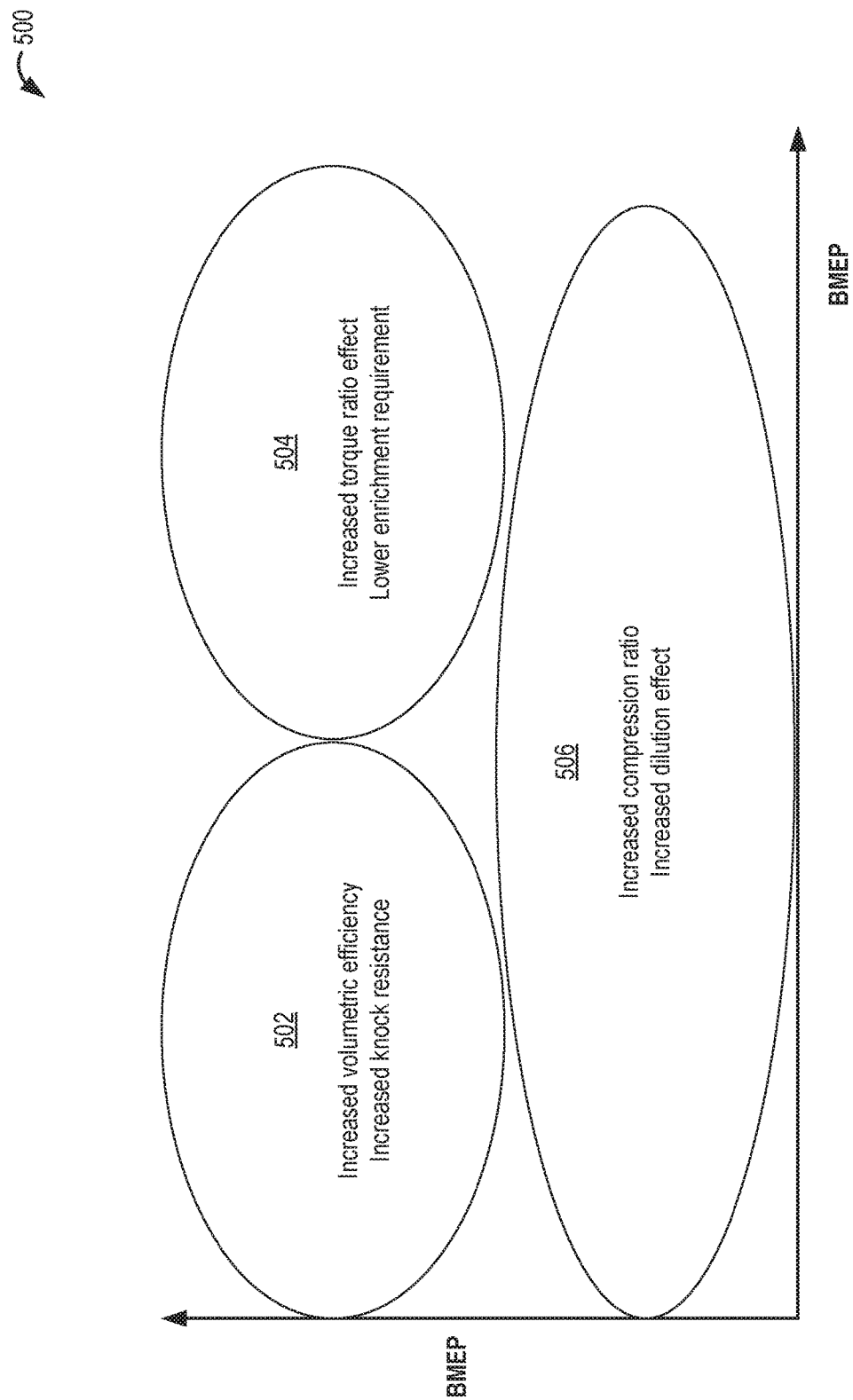
FIG. 5 shows an example map of water injection benefits as a function of engine speed-load regions.

FIG. 5 depicts an example map 500 of the different water injection benefits in different engine operating regions. In high load and low speed engine operating regions, denoted by region 502, water injection provides a torque output benefit by increasing the volumetric efficiency. In addition, knock resistance is increased due to an advancement in the combustion phasing (that is, advanced CA50). In high load and high speed engine operating regions, denoted by region 504, water injection provides both a fuel economy and a torque output benefit due to an advancing of borderline spark limit (BDL) as well as an advance in the combustion phasing (that is, advanced CA50). This results in an enhanced torque ratio. In addition, the water injection reduces the turbine inlet temperature, thereby reducing the requirement for fuel enrichment (for knock control).

In low load engine operating regions, denoted by region 506, water injection improves the thermal efficiency by enabling the engine design to tolerate a higher compression ratio. In addition, injecting water as a vapor can decrease pumping losses (and increase MAP), thereby creating a dilution effect similar to EGR. This translates into a direct fuel economy improvement.

In addition to the region-specific benefits listed above, at any given output torque, water injection can reduce the intake charge temperature resulting in a lower MAP and improved thermal efficiency through better combustion phasing (more advanced borderline spark). The improvement in thermal efficiency reduces the required air flow. Since the turbocharge speed is a function of both the pressure ratio and mass flow, reducing the MAP reduces the mass flow, and thereby the turbocharger speed, lowering the pressure ratio across the compressor. The lower pressure ratio reduces the compressor outlet temperature, extending the life of the compressor. Further, the lower compressor outlet temperature reduces the engine's pumping work (due to the engine operating with a more open wastegate, and requiring less turbine power). In addition to knock, each of turbocharger speed, compressor outlet temperature, peak cylinder pressure, and turbine inlet temperature can limit the peak power of a turbocharged engine. Consequently, for a given pressure ratio, by leveraging water injection, the output torque becomes higher.

As such, the map of FIG. 5 describes the general water injection benefits. However, it will be appreciated that the water injection benefits may be further affected by the location of water injection. For example, manifold water injection may provide dilution benefits at low load, and charge cooling benefits at high load. As another example, direct water injection may provide charge cooling benefits. As still a further example, port water injection may provide dilution benefits or charge cooling benefits based on the direction of water injection (e.g., towards or away from an intake valve) as well as a timing of the injection in relation to intake valve timing (e.g., when the intake valve is open or closed). As elaborated herein, the controller may select a location for water injection based on engine operating conditions (as shown in the methods presented at FIGS. 2-3 and described further below) that increase the water injection benefits described above, thereby increasing engine efficiency, increasing fuel economy, and decreasing emissions. Additionally, depending on the location for water injection, different sets of sensors may be used to provide a more accurate estimate of an amount of water that was injected. Thus, as explained further below with reference to FIG. 3, a mode for sensing may be selected based on the location of water injection and subsequent ater injection parameters and engine operating parameters may be adjusted based on the estimated water injection amount. For example, water injection operating parameter adjustments may compensate for an estimated amount of injected water being less than a commanded amount.

Figure 2:
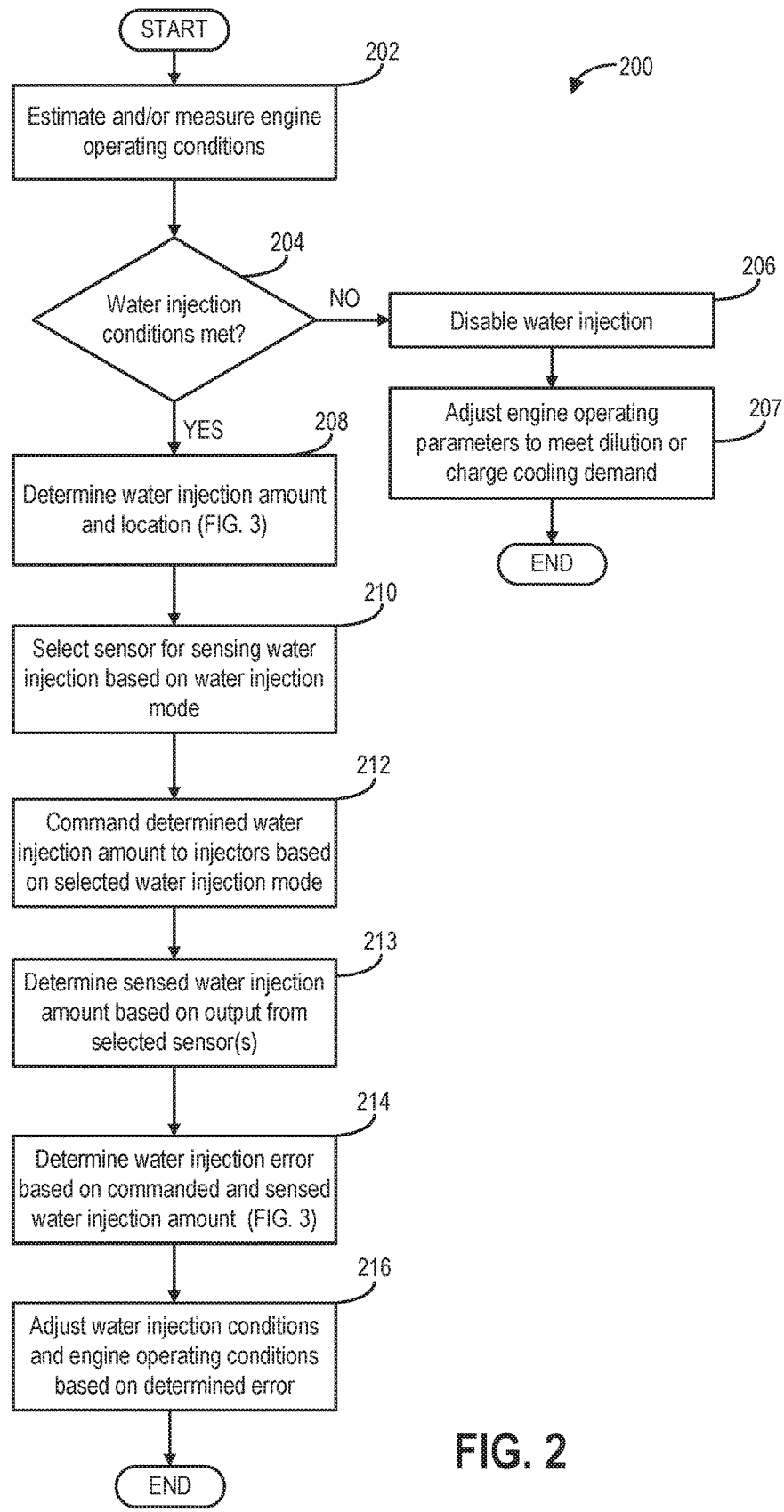
FIG. 2 shows a flow chart of a method for injecting water into an engine based on an engine dilution or cooling request.

Turning to FIG. 2, an example method 200 for injecting water into an engine is depicted. Instructions for carrying out method 200 and the rest of the methods included herein may be executed by a controller (such as controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. In one example, water may be injected via one or more water injectors using water stored in a water storage tank of a water injection system (such as water storage tank 63 of water injection system 60 shown in FIG. 1).

The method 200 begins at 202 by estimating and/or measuring engine operating conditions. Engine operating conditions may include driver torque demand, manifold pressure (MAP), air-fuel ratio (A/F), spark timing, ambient conditions including ambient temperature, pressure, and humidity, boost pressure, an exhaust gas recirculation (EGR) rate, mass air flow (MAF), manifold charge temperature (MCT), engine speed and/or load, an engine knock level, etc.

Next, at 204, the method includes determining whether water injection conditions have been met. Water injection may be requested to leverage one or more benefits associated with water injection. For example, water injection may be requested at low-mid engine loads to increase charge dilution, thereby improving combustion stability in the low-mid load engine operating region. As another example, water injection may be requested at mid-high engine loads to increase charge cooling, thereby improving knock relief in the mid-high load engine operating region. Further still, water injection may be requested at high loads to provide component cooling, such as to cool the exhaust gas, cool an exhaust catalyst, etc. Water injection conditions may be considered met responsive to engine load being higher than a threshold load (below which engine combustion stability may be affected) and spark timing being retarded (e.g., from MBT) by more than a threshold amount.

In one example, water injection may be requested in response to a manifold temperature being greater than a threshold level. Additionally, water injection may be requested when a threshold engine speed or load is reached. In yet another example, water injection may be requested based on an engine knock level being above a threshold. Further, water injection may be requested in response to an exhaust gas temperature being above a threshold temperature, where the threshold temperature is a temperature above which degradation of engine components, downstream of cylinders, may occur. In addition, water may be injected when the inferred octane number of used fuel is below a threshold.

Confirming that water injection conditions have been met may further include confirming that water is available for injection by estimating and/or measuring water availability. Water availability for injection may be determined based on the output of a plurality of sensors, such as a water level sensor, a water quality sensor, and/or a water temperature sensor disposed in the water storage tank of the water injection system of the engine (such as water level sensor 65 and water temperature sensor 67 shown in FIG. 1). For example, water in the water storage tank may be unavailable for injection in freezing conditions (e.g., when the water temperature in the tank is below a threshold level, where the threshold level is at or near a freezing temperature). In another example, the level of water in the water storage tank may be below a threshold level, where the threshold level is based on an amount of water required for an injection event or a period of injection cycles. If water injection conditions are not met, at 206, the method includes disabling water injection. In one example, where water injection conditions are not met due to water injection not being requested, the method includes continuing engine operation without water injection. In another example, where water injection conditions are not met due to water not being available for injection, such as when the water level of the water storage tank is below a threshold level, the controller may indicate that refilling of the tank is required. In addition, the controller may refill the water tank by increasing on-board collection of water from one or more vehicle systems, such as by collecting water from a water collection system coupled to a water storage tank of a water injection system of the engine (such as water collection system 72 shown in FIG. 1). This includes increasing air conditioning (AC) condenser operation to increase AC condensate collection, increasing EGR condensate collection, increasing CAC condensate collection, etc.

At 207, the method further includes adjusting engine operating parameters to compensate for the lack of water injection. For example, if water injection has been requested to reduce knock, engine operation adjustments may include enriching the air-fuel ratio, reducing an amount of throttle opening to decrease manifold pressure, or retarding spark timing to provide knock relief. As another example, if water injection was requested to increase charge dilution, engine operation adjustments may include increasing EGR flow.

Figure 3:
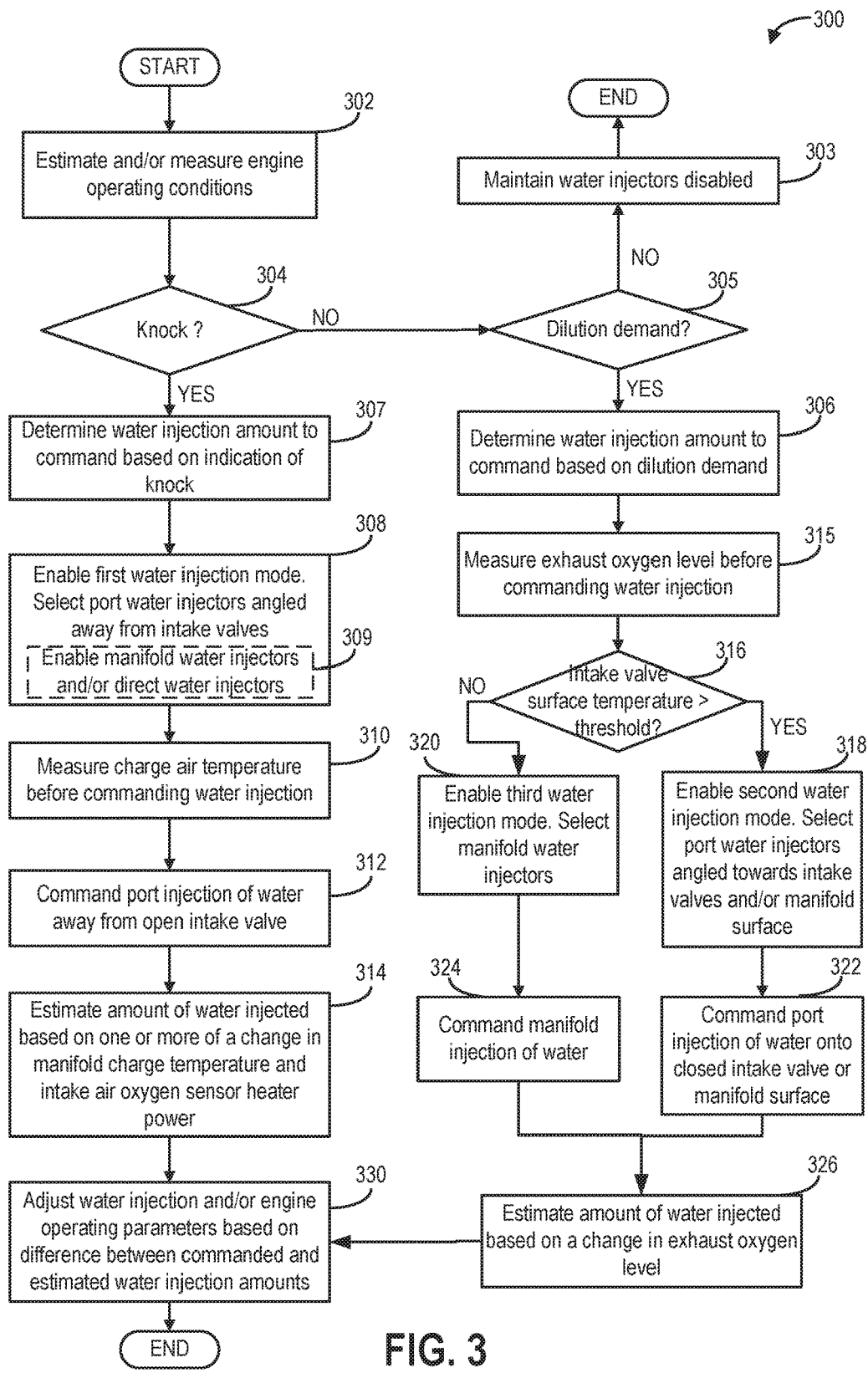
FIG. 3 shows a flow chart of a method for selecting a mode for water injection based on engine operating parameters.
Figure 4:
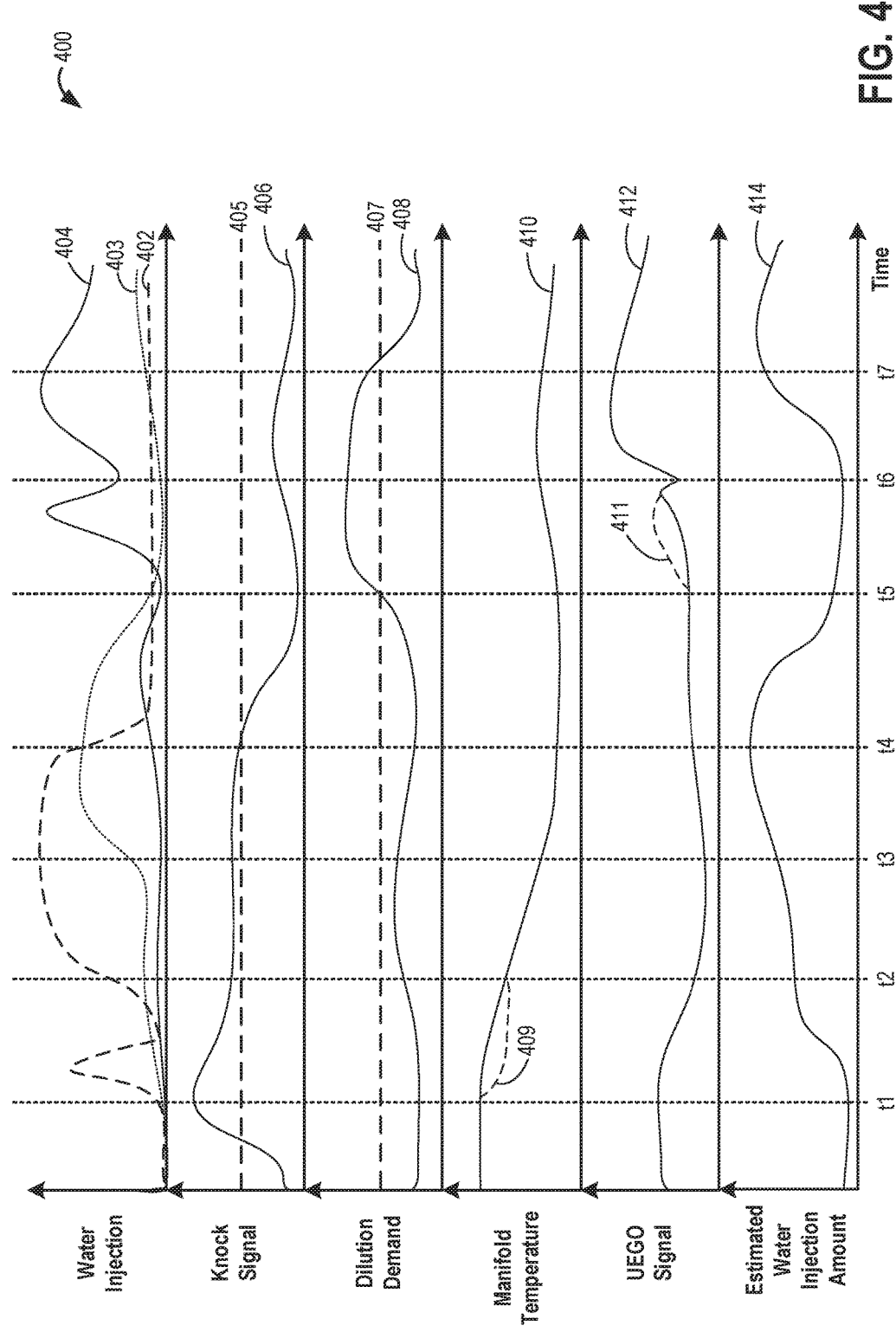
FIG. 4 shows a graph depicting example adjustments to water injection parameters based on various engine operating conditions.

If water injection conditions are met, the method continues at 208 to determine a water injection amount and location, as described further with regard to FIG. 3. The controller may determine an amount of water to inject based on one or more of an engine speed/load, temperature, and knock. The controller may refer a look-up table that uses engine speed and load as an input and provides a net (total) amount of water to command for water injection into the engine as an output. At 208, determining water injection parameters, such as the water injection amount and location, may further include selecting a mode for water injection. In one example, determining a location for water injection may include selecting a mode for water injection in response to detecting (or predicting) engine knock. In another example, selecting a location for water injection may include selecting a mode for water injection responsive to a dilution demand of the engine. Selecting the mode of water injection may include selecting one or more of a manifold water injector, a direct water injection, and a port water injector based on the water injection benefit desired. Further, based on whether charge cooling or dilution is desired, the controller may determine a proportion of the total commanded water injection amount to be delivered via the different water injectors (herein also referred to as a water injection ratio). The proportioning may be based on the location of the injectors, the total commanded amount in relation to the duty cycle of the individual injectors, injector constraints, as well as manifold humidity limits. As an example, at low engine loads, charge dilution may be required. Based on the engine speed and load, the controller may determine a total amount of water to be commanded for injection. Also, the controller may select the manifold injector for the water injection. If the commanded amount exceeds the injection limits of the manifold injector, at least a portion of the injection may be provided via a port water injector. In an alternate example, if the intake humidity is elevated at the time of the injection, at least a portion of the injection may be provided via a direct water injector.

Then, at 210, the method includes selecting a sensor for sensing water injection based on the water injection mode. Based on the location of the water injection, as well as an engine speed-load at which the injection is performed, different water injection benefits may be provided. Accordingly, distinct sets of sensors may be used to estimate the actual amount of water injection. As elaborated at FIG. 3, when the water injection is into the manifold to provide a charge dilution benefit, the water injection may be sensed via sensors that detect a change in the intake (or exhaust) dilution. For example, an intake oxygen sensor may be selected for estimating the change in dilution (due to the presence of additional oxygen from the added water). As another example, an intake humidity sensor may be selected for estimating the change in intake humidity (due to the presence of added water). In another example, when the water injection is into the manifold to provide a charge cooling benefit, the water injection may be sensed via sensors that detect a change in the manifold temperature (such as an MCT sensor).

At 212, the method includes injecting water into the engine based on the selected water injection mode. For example, the controller may send a signal to an actuator of the selected water injector to vary the pulse-width of the injector, thereby commanding the determined amount of water.

It will be appreciated that one or more engine operating parameters may be adjusted responsive to the commanded water injection. As an example, spark timing may be advanced (e.g., towards MBT from a current timing that is retarded from MBT) responsive to the water injection. In one example, the degree of spark advance may be increased as the water injection amount increases.

The method continues at 214 to estimate a water injection error based on the commanded water injection amount relative to a sensed water injection amount. At 213, the method includes receiving output from the selected one or more sensors following water injection and determining an actual water injection amount (or sensed water injection amount) based on the sensor output. The controller may compare the output of the selected sensor(s) from before the water injection to sensor output after the water injection to determine the actual amount of water that was received in the engine (that is, the actual amount that contributed to the charge cooling and/or dilution effect). As discussed earlier, the actual water injection amount may vary from the commanded water injection amount due to injector errors, due to water spray impingement errors, vaporization issues due to conditions in the vicinity of the injector, etc. This can result in a water injection error that, if not accounted for, can reduce the intended benefits of the water injection and even degrade engine performance. At 214, the method includes estimating the water injection error based on the commanded water injection amount relative to the sensed water injection amount.

Next, at 216, the method includes adjusting water injection conditions and engine operating conditions based on the determined error. Herein, one or more engine parameters are adjusted to compensate for the water injection error. In one example, the method at 216 includes adjusting the amount of water and/or timing of water delivered by the selected water injector(s) for a subsequent water injection (e.g., an immediately subsequent water injection with no water injection in between, or a number of successive water injections following the water injection with the error) based on the determined error. For example, at 216 the method may include increasing the amount of water for the water next injection by the same water injector (for example, by commanding a larger pulse-width) in response to the sensed water injection amount being less than the commanded water injection amount. As another example, during the subsequent water injection by the same water injector, the pulse-width of the given water injector may be increased by an amount and the pulse-width of another water injector may also be increased.

The adjusting of the water injection at 216 may differ depending on the injectors present in the engine embodiment, as well as which injectors are selected for water injection. For example, for engine systems configured with port injectors where distinct port water injectors are positioned upstream of distinct groups of cylinders, the controller may adjust a water injection amount for each water injector, or only a selected port water injector. In another example, where one or more injectors are located upstream of multiple cylinders or a group of cylinders, such as with manifold injection, the controller may adjust injection timing of the selected water injector to be synced with intake valve opening timing of that cylinder group to adjust water injection to the corresponding group of cylinders.

In another example, adjusting one or more engine operating parameters based on the determined error may include adjusting one or more of spark timing, EGR flow (via adjustments to an EGR valve position), engine fueling, throttle position, combustion air-fuel ratio, etc. As an example, spark timing adjustments may be used to compensate for the determined error of the injected water when the water injection was used for knock control (and charge cooling). Therein, responsive to a water injection deficit (less water was actually received than was commanded), spark timing may be retarded (e.g., from MBT or from original borderline spark), an amount of spark retard increased as the water injection error increases. In another example, EGR adjustments may be used to compensate for the determined error of the injected water when the water injection was used for dilution control. Therein, responsive to a water injection deficit (less water was actually received or evaporated than was commanded), EGR flow may be increased by increasing a degree of opening of the EGR valve. Further still, a fuel injection amount may be adjusted based on the determined water injection error.

In this way, water injection may be commanded to leverage the benefits at different locations of water injection. In addition, water injection may be accurately sensed based on the selected water injection location, and appropriately compensated for.

FIG. 3 shows an example method 300 for selecting a water injection mode based on engine operating conditions. In addition, the method selects a water injection sensing mode based on the water injector selection. Method 300 may be performed as part of the method of FIG. 2, such as at 208 and 214. As described above, water injection may be used to reduce a temperature of the intake air entering engine cylinders and thereby reduce knock. Additionally, injecting water may be used to increase engine dilution and thereby reduce engine pumping losses. Water may be injected into the engine at different locations depending on a desired water injection benefit based on engine operating conditions. Further, one or more sensors may be selected for estimating an amount of water injected based on the water injection location.

The method 300 begins at 302 by estimating and/or measuring engine operating conditions. Engine operating conditions may include driver demanded torque, manifold pressure (MAP), air-fuel ratio (A/F), spark timing, an exhaust gas recirculation (EGR) rate, mass air flow (MAF), manifold charge temperature (MCT), engine speed and load, etc. Next, at 304, the method includes determining whether there is an indication of knock. Indicating knock may include knock being detected or knock being anticipated. The controller may determine if knock is occurring based on output from one or more engine knock sensors (such as knock sensors 183 shown in FIG. 1) exceeding a knock threshold. In an alternate example, knock may be anticipated when the engine speed and load is greater than a threshold. Further still, the likelihood of knock in one or more cylinders may be based on the knock history (e.g., knock count) of the engine. When the engine is knock limited, water injection may be requested in order to provide charge cooling.

If knock is indicated at 304, the method continues to 307 wherein the amount of water to inject is determined based on the indication of knock. Herein the amount of water is to be delivered to provide a charge cooling benefit to the engine. In one example, as the output of the knock sensor exceeds the knock threshold (that is, as the knock intensity increases), the amount of water to be injected may be increased. As another example, as the engine speed-load increases and the corresponding likelihood of knock increases, the amount of water to be injected into the engine may be increased. Herein, the amount of water refers to the total amount of water delivered to the engine, which may be delivered via one or more water injectors.

At 308, the method includes enabling a first water injection mode to deliver the determined water injection amount. In the first water injection, port water injectors angled away from the intake valves may be selected for delivering the water. The controller may send a signal to the selected port injectors to activate them. The selected port water injectors may be angled away from the intake valve, and facing the intake port, and may be arranged to inject water against the intake air flow direction through the intake runner (such as water injectors 46 shown in FIG. 1). As elaborated below, the port water injection away from the valve may be timed to occur when the intake valve is open. By delivering water as an open-valve injection against the air flow direction, more of the injected water may be entrained into the air stream, thereby increasing the cooling benefit of the water injection at high loads. Furthermore, the injection of water towards the manifold and away from the (closed) intake valve ensures a better water distribution in each downstream cylinder. In addition, the high speed of the air flow in the runners generates a turbulence that ensures better atomization and mixing of the water with the air, further enhancing the charge cooling benefit of the water injection.

Additionally or alternatively, at 309, enabling the first water injection mode may include enabling manifold water injectors and selectively enabling direct water injectors. The manifold water injectors may be located in a pre-throttle location (as shown with reference to manifold injector 45 in FIG. 1) or in a post-throttle location. In embodiments that include both port and manifold injectors (such as water injection system 60 shown in FIG. 1), the controller may give a higher priority to the port water injectors if a temperature imbalance is detected for a group of cylinders. As one example, temperature maldistribution among a group of cylinders may occur to due to prior water injection events in some cylinders and not in other cylinders, causing the former cylinders to be cooler than the latter ones. As another example, temperature mal-distribution between cylinders may be due to engine design reasons, such as due to some cylinders hotter due to proximity to a water pump while other cylinders being cooler. Further still, the temperature mal-distribution may occur due to a water imbalance between the cylinders following water injection from a common water injector. The temperature maldistribution may be detected by comparing measured or inferred (modeled) in-cylinder temperatures. For example, a standard deviation in temperatures corresponding to the different cylinders may be determined and if the standard deviation is greater than a threshold standard deviation value, temperature imbalance may be indicated. In yet further examples, temperature maldistribution among a group of cylinders may occur due to non-uniform airflow to engine cylinders, variations between valves and cylinders due to deposit build up, differences amongst fuel injectors, etc.

The water maldistribution may be determined based on a comparison of knock outputs of knock sensors coupled to each cylinder in the group (such as knock sensors 183 shown in FIG. 1). For example, the knock output may be used to determine differences in knock intensity in individual cylinders relative to other cylinders in the group. If the change in knock intensity following water injection is different for one or more cylinders in a group compared to the others, this may indicate differences in water distribution. For example, a standard deviation in knock outputs corresponding to different cylinders may be determined and if the standard deviation is greater than a threshold standard deviation value, water imbalance may be indicated. In yet another example, if a knock output corresponding to an individual cylinder differs from an average value of all knock outputs corresponding to all cylinders of the group, by a threshold amount, the individual cylinder may be indicated as receiving more or less water than the other cylinders in the group. In another example, water maldistribution among a group of cylinders coupled to a water injector may be determined based on differences in spark retard in individual cylinders from an expected amount, the expected amount based on engine mapping. If there is no temperature mal-distribution, the controller may inject water via manifold water injectors (such as manifold injector 45 shown in FIG. 1).

In another example, selection between the port and manifold injectors (or determination of a ratio of water to deliver as a port injection relative to a manifold injection) may be based on the amount of water to inject, injector constraints, and the intake humidity. As an example, as the intake humidity increases, the amount of water that is delivered via the manifold injector may be decreased (and the amount of water delivered via the port injector correspondingly increased). In an alternate example, if the manifold water injection is at a maximum rate (or at a saturation limit), water injection may be provided via direct injection into the knock affected cylinder. As another example, if the total amount of water to be injected exceeds an upper limit of the manifold injector, the excess amount may be delivered via the port injector. As another example, if the total amount of water to be injected exceeds an upper limit of the port injector, the excess amount may be delivered via the manifold injector. In another example, selection between the port and manifold injectors may be based on the mass air flow entering the engine. If there is a greater amount of air entering the engine at a higher speed then manifold injection may be preferential to port injection. This is because manifold injection (especially in the case of manifold injection where water is sprayed opposite the direction of airflow) would allow for more time for the injected water to mix, evaporate, and cool in the incoming air charge as opposed to port injection, which would be more preferential to valve head cooling and would have much less time and opportunity to mix with the incoming air charge.

In response to water injection being used for charge cooling, the water injection is sensed and controlled using a temperature based control loop. Specifically, at 310, the method includes measuring a charge air temperature before initiating the water injection. In one example, the controller may receive output from a manifold charge temperature sensor (such as MCT sensor 23 shown in FIG. 1) to determine the manifold temperature prior to water injection. In another example, the controller may monitor an output of an intake air oxygen sensor heater (operating in a heater power mode, such as IAO2 sensor 34 shown in FIG. 1). In yet another example, the method at 310 may include inferring the temperature of the charge air proximate to the water injectors based on one or more engine operating conditions (such as measured intake and exhaust air temperatures, engine load, knock intensity signal, etc.).

Then, at 312, the method includes commanding port injection of water away from the open intake valves. The controller may send a pulse-width signal to actuators of the port water injectors angled away from the intake valves and towards the intake manifold to inject the determined amount of water in response to the indication of engine knock. Injecting water at 312 may include injecting the determined (e.g. commanded) amount of water as a single pulse per engine cycle or as a series of pulses timed to the intake valve opening of each cylinder within the cylinder group downstream of the port injector. If manifold water injection is additionally or alternatively selected, the controller may command a corresponding pulse-width to the manifold injector.

Figure 6:
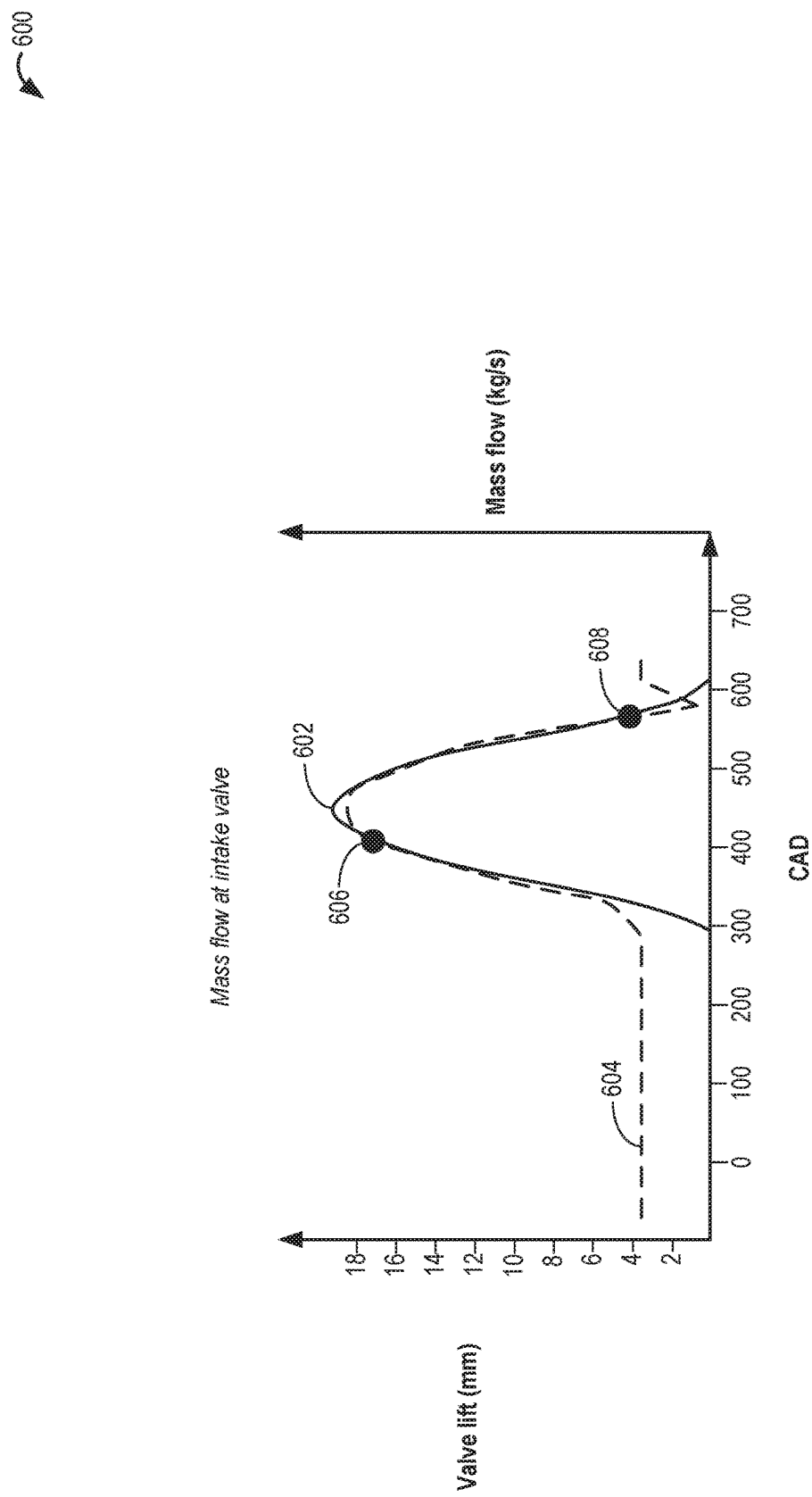
FIG. 6 shows a plot of example port water injection timings in relation to intake valve position in an engine cycle.

FIG. 6 shows an example port injection timing for knock relief. Map 600 depicts intake valve lift at plot 602 (solid line), and corresponding mass air flow through the intake valve at plot 604 (dashed line). All plots are shown with reference to engine position (in crank angle degrees) along the x-axis. The intake valve lifts towards the beginning of an intake stroke (around 300 CAD, when the piston of the cylinder is at TDC), reaches a maximum lift (about half way between TDC and BCD), and then starts to close, closing fully by the end of the intake stroke (around 600 CAD, when the piston of the cylinder is at BDC). The mass flow through the intake valve follows a similar profile, increasing when the intake valve lift increases, and then decreasing when the intake valve lift decreases.

Port injection away from an open intake valve may be performed at reference point 606 where the intake valve is almost fully open, and the mass flow into or towards the intake valve is almost at the highest point. By port injecting water away from the valve surface, towards the intake port or manifold at this time, more water may become entrained in the intake air flow, thereby increasing the cooling benefit provided by the water injection. In particular, a larger portion of the water is delivered in liquid form, increasing the heat withdrawing and charge cooling ability of the water injection.

Returning to FIG. 3, at 314, the method includes estimating or sensing an amount of water received in the engine based on one or more of a change in manifold charge temperature and intake air oxygen heater power following the water injection. In one example, the controller receive a first output from the manifold charge temperature sensor before the water injection (at 310). The water injection may cause a charge cooling effect in the manifold due to the injected water using the ambient heat to vaporize. This effect may be observed as a drop in the manifold charge temperature. The controller may receive a second output from the manifold charge temperature (MCT) sensor after the water injection (e.g., immediately after the water injection, or after a duration since the water injection) and determine the amount of water injected based on a change in the manifold temperature as indicated by a difference between the first and the second output of the MCT sensor. As the difference increases, the amount of water sensed or detected in the engine may be increased. The duration between the water injection event and the measuring of the manifold charge temperature may be based on an expected amount of time required for the injected amount of water to vaporize. This duration may be adjusted based on the amount of water injected, the duration increased as the amount of water injected via the injector increases.

In another example, at 310, the controller may receive a first power output of the intake air oxygen sensor heater before the water injection. The heater is configured to maintain a substantially constant temperature of the intake oxygen sensor so as to enable proper functioning of the sensor. Responsive to the charge cooling, an ambient temperature at the sensor may drop, causing a corresponding drop in the sensor temperature. The sensor heater power may automatically increase in an effort to maintain the sensor temperature. Therefore, the charge cooling effect of the water injection may be observed as a rise in the intake oxygen sensor (IAO2) heater's power output. The controller may receive a second power output from the sensor heater after the water injection (e.g., immediately after the water injection, or after the duration since the water injection) and determine the amount of water injected based on a change in the heater power output indicated by a difference between the first and the second power output of the IAO2 sensor heater. As the difference increases, the amount of water sensed or detected in the engine may be increased. In this way, a vaporized portion of the injected water (that is, the portion providing the charge cooling benefit) may be determined at 314 based on the change in manifold charge air temperature from before to after the water injection event.

At 330, a water injection error is determined based on a difference between the commanded water injection amount (at 312) and the detected water injection amount (at 314). This reflects the error between the amount of water that was intended to be delivered for knock relief and the amount of water that was actually was received in the engine for knock relief. In one example, the actual amount received may be lower than the commanded amount, resulting in a water deficit, and a corresponding charge cooling deficit. The controller may then adjust subsequent water injection events to compensate for the learned water injection error. Additionally, one or more engine operating parameters may be adjusted to compensate for the learned water injection error. For example, spark timing may be retarded and/or a combustion air-fuel ratio may be enriched. However, by using water injection to provide a large portion of the charge cooling, the amount of spark retard or fuel enrichment needed is reduced, improving fuel economy.

Returning to 304, if engine knock is not detected, the method continues at 305, where the method includes determining whether there is a dilution demand. As described with reference to FIG. 5, water may be injected to increase intake charge dilution and reduce pumping losses. In one example, increased dilution may be requested in response to an engine speed/load being below a threshold, where the threshold engine speed/load may be indicative of a speed-load region where pumping losses are more likely to occur. In another example, charge dilution may be demanded when the engine is at or near a combustion stability limit. If a dilution demand is not confirmed, the method moves to 303 to maintain all water injectors of the engine system disabled. The routine then ends and the engine is operated without water injection.

If water injection is requested for dilution at 305, the method continues to 306 wherein the amount of water to inject is determined based on the dilution demand. Herein the amount of water is to be delivered to provide a charge dilution benefit to the engine. In one example, as the engine speed-load decreases and the engine combustion stability approaches a limit, the amount of water to be injected into the engine for dilution demand may be increased. Herein, the amount of water refers to the total amount of water delivered to the engine, which may be delivered via one or more water injectors.

In response to water injection being used for charge dilution, the water injection is sensed and controlled using a dilution based control loop. Specifically, at 315, the method includes estimating an exhaust oxygen level (or exhaust humidity) based on output from an exhaust oxygen sensor (or UEGO sensor, such as UEGO 126 shown in FIG. 1) operating in a variable voltage mode. In the variable voltage mode, the sensor is modulated between a lower reference voltage (such as 450 mV) and a higher reference voltage (such as 950 mV). The higher voltage causes dissociation of any water in the exhaust into oxygen and the sensor senses the excess oxygen. The controller may compare the pumping current output by the sensor at the lower voltage to the pumping current output by the sensor at the higher voltage, and learn a first sensor output as the difference between the pumping currents at the reference voltages. By comparing the first sensor output measured before commanding a water injection to a second sensor output measured after the water injection, the controller may determine an amount of injected water that evaporated in the engine and contributed to charge dilution. Additionally or alternatively, the controller may receive outputs from one or more dilution sensors such as an intake air oxygen sensor (such as IAO2 sensor 34 shown in FIG. 1) operating in a variable voltage mode, and an intake humidity sensor.

At 316, the method includes estimating and/or measuring an intake valve surface temperature to determine if the temperature is higher than a threshold. The threshold may correspond to a temperature above which water may evaporate upon touching the surface without providing any cooling effect. In one example, the valve surface temperature may be estimated or inferred based on a measured engine temperature, such as a determined based on the output of an engine coolant temperature sensor (such as engine coolant temperature sensor 25 shown in FIG. 1). In another example, the valve surface temperature may be inferred based on engine speed and load conditions, the temperature increased as the engine load increases.

The inventors herein have recognized that when a dilution effect is required at low engine loads, water can be injected towards a hot surface and evaporated immediately. For example, water may be port injected towards a hot intake valve surface and evaporated immediately, wherein the port injection timing is adjusted to coincide with the closing of the intake valve. As a result of the port water injection onto a closed, or almost closed, intake valve surface, more of the injected water may immediately evaporate, thereby increasing the dilution benefit of using the water vapor as EGR by reducing pumping losses while minimizing the cooling effect of the water injection. As such, if the valve surface is not hot enough, the injected water may puddle on the valve surface.

Therefore, responsive to the dilution demand, upon confirming that the valve surface is sufficiently hot, at 318, the method includes enabling a second water injection mode wherein port water injectors angled toward the intake valves, are selected for water injection onto a closed intake valve. Alternatively, the port water injectors may be angled towards the intake valve and configured to inject onto the valve surface and/or surrounding manifold surface. Herein the water injection occurs in the same direction as the intake air flow direction through the intake port/runner, and opposite to the direction of port water injection for knock relief (at 312).

At 322, the method includes commanding the determined water injection amount as a port injection onto a closed intake valve surface. For example, the controller may send a pulse-width signal corresponding to the determined water injection amount to an actuator of the port water injector to inject water when the intake valve is closing, such as at BDC of an intake stroke. In one example, the injector may deliver the commanded amount of water as a single pulse per engine cycle (for all intake valve closing events for all cylinders of the group). In another example, the injector may deliver the amount of water as a series of pulses timed to the intake valve closing of each cylinder within the cylinder group. By injecting water into a closed intake valve and/or onto a manifold surface, more of the injected water may contact hot surfaces of the manifold, thereby increasing an amount of injected water that evaporates.

With reference to FIG. 6, port injection towards a closed intake valve may be performed at reference point 608, just before the intake valve is about to close, and the mass flow into or towards the intake valve is almost at the lowest point. By port injecting water onto the hot valve surface of a closed intake valve, the water may be rapidly evaporated, increasing the charge dilution benefit of the water injection while decreasing the charge cooling benefit. In particular, a larger portion of the injected water is delivered in the vapor form (flash vaporized), improving the charge dilution ability of the injection.

Returning to FIG. 3, if the valve surface is not sufficiently hot, at 320, the method includes enabling a third water injection mode wherein manifold water injectors are selected for water injection into an intake manifold. At 324, the method includes commanding the determined water injection amount as a manifold injection. For example, the controller may send a pulse-width signal corresponding to the determined water injection amount to an actuator of the manifold water injector.

In further examples, selection between the port and manifold injectors (or determination of a ratio of water to deliver as a port injection relative to a manifold injection) may be based on the amount of water to inject, injector constraints, and the intake humidity. As an example, as the intake humidity increases, the amount of water that is delivered via the manifold injector may be decreased (and the amount of water delivered via the port injector correspondingly increased). In an alternate example, if the manifold water injection is at a maximum rate (or at a saturation limit), water injection may be provided via port injection. As another example, if the total amount of water to be injected exceeds an upper limit of the manifold injector, the excess amount may be delivered via the port injector. As another example, if the total amount of water to be injected exceeds an upper limit of the port injector, the excess amount may be delivered via the manifold injector. In another example, selecting between the port and manifold injectors may be based on the mass air flow entering the engine, as described previously.

After commanding the water injection, the method includes estimating or sensing an amount of water received in the engine. Since the water injection is for dilution control, the sensing is based on a measured change in engine dilution or humidity. Therefore from each of 322 and 324, the method moves to 326 wherein the routine includes estimating an amount of water injected based on a change in exhaust oxygen level. For example, the controller may receive a first output from the UEGO sensor operating in the variable voltage mode before the water injection, and a second output from the UEGO sensor operating in the variable voltage mode. As elaborated earlier, the sensor is modulated between a lower reference voltage (such as 450 mV) and a higher reference voltage (such as 950 mV), the higher voltage causing dissociation of the added water in the exhaust into oxygen, and the sensor sensing the excess oxygen. The controller may compare the pumping current output by the sensor at the lower voltage to the pumping current output by the sensor at the higher voltage, following the water injection, and learn a second sensor output as the difference between the pumping currents at the reference voltages following the water injection. The controller may then determine a sensed or actual amount of water that evaporated in the engine based on a difference between the first and second outputs, the sensed amount increased as the difference increases.

In another example, the controller may compare the outputs from the intake air oxygen sensor (such as IAO2 sensor 34 shown in FIG. 1), and the intake humidity sensor from before and after the water injection to determine the amount of injected water that was actually received and evaporated in the engine.

The sensor selection may be further based on the nature of the injection. As an example, when the water is port injected directly onto the valve surface, the IAO2 sensor and the humidity sensor may not be able to provide an accurate reading of the amount of water injected. In those conditions, the exhaust UEGO sensor may be selected. In comparison, when the water is manifold injected, one or more of the IAO2 sensor and the humidity sensor may be selected for sensing the water injection error.

It will also be appreciated that during conditions when the manifold water injector is used for dilution control or knock control, and the manifold water injection is at a maximum rate or at a saturation limit (such as when the intake humidity is at a threshold), the controller may rely on the exhaust oxygen sensor operating in the variable voltage mode for sensing the water injection. During conditions when the manifold is saturated, the intake humidity sensor also becomes saturated, and is unable to sense the amount of water injected into an intake manifold. Also, a charge temperature measurement via an MCT sensor may be confounded by the presence of liquid water on the sensor. Therefore both sensors may be inaccurate and their output may be unreliable.

If the intake air is fully saturated, water may also penetrate the IAO2 sensor protection tube causing the sensor to always show a full dilution (even when full dilution conditions are not present). Therefore the IAO2 sensor may also be inaccurate and its output may be unreliable. During conditions when the IAO2 sensor output shows saturation (which is indicated when the pumping current of the sensor becomes 0), the controller may operate the IAO2 sensor in the variable voltage mode in order to dissociate the water in the protection tube surrounding the sensor element, thereby obtaining a more accurate and reliable reading of the amount of water.

During such conditions, the UEGO sensor operating in the variable voltage mode can provide a reliable output. The UEGO based dilution, as sensed via the sensor operating in a nominal mode (where the sensor is only operated at the lower reference voltage) may be unable to determine the amount of water injected into the engine because the engine continues to operate at stoichiometric conditions (e.g., lambda 1.0) so the pumping current (Ip) does not change (e.g., remain at 0). The UEGO operating in the variable voltage mode provides a more accurate method of monitoring the total water injected during such conditions (that is, the sum of the water injected into the manifold, into the air stream, into the cylinder, etc.) since the sensor is at the downstream-most location, and the modulation dissociates all the added water into hydrogen and oxygen, enabling the sensor to sense the excess oxygen from all the added water.

From 326, the method moves to 330 wherein the controller adjusts water injection and/or engine operating parameters based on a difference between the commanded and the sensed water injection amounts (that is, based on the learned water injection error). Adjusting water injection may include adjusting an amount and/or timing of water injected during a subsequent water injection event (from the same water injector or one or more different water injectors) based on the output from the plurality of sensors. For example, the controller may increase an amount of water injected for a subsequent water injection in response to the sensed water injection amount being lower than the commanded water injection amount. Additionally, an injection timing of the selected water injector may be adjusted. In one example, the injection timing of the selected water injector may be synchronized with intake valve opening timing of a given cylinder to adjust water injection to the cylinder. Further, one or more engine operating parameters may be adjusted to compensate for the water injection error. In one example, EGR flow be increased responsive to the water injection error when the error results in a dilution deficit. For example, the controller may increase EGR flow based on the water injection error by increasing a degree of opening of the EGR valve. As another example, cam timing adjustments (e.g., VCT adjustments) may be used to compensate for the dilution deficit.

In this way, a controller may select a water injector from one of a port injector, a manifold injector, and a direct injector for injecting a commanded amount of water into an intake manifold; then select one of a plurality of engine sensors based on the water injector selection; and adjust engine operating parameters, following the injecting, based on output from the selected sensor. The plurality of sensors may include an intake oxygen sensor, an exhaust oxygen sensor, a humidity sensor, a manifold temperature sensor, an intake humidity sensor, and an engine coolant temperature sensor. The adjusting may include estimating an actual amount of water received in the engine based on the output from the selected sensor and adjusting engine operating parameters as a function of the commanded amount relative to the actual amount. As an example, selecting the water injector may include, at lower than threshold engine load and lower than threshold engine speed conditions, selecting the port injector; and at higher than threshold engine load and lower than threshold engine speed conditions, selecting the manifold injector. Selecting the water injector may further include injecting a portion of the commanded amount via the manifold injector until a manifold injector limit (such as a saturation limit or a maximum flow rate through the injector) is reached, and then injecting a remaining portion of the commanded amount via the direct injector. Selecting the port injector may further include injecting the commanded amount, via the port injector, towards an intake valve of an engine cylinder before intake valve opening when the engine is not knock limited; and injecting the commanded amount, via the port injector, away from the intake valve of the engine cylinder after intake valve opening when the engine is knock limited. Selecting the sensor may include, following the injecting via the first port injector towards the intake valve, estimating the actual water amount via one of the manifold temperature sensor and the engine coolant temperature sensor; following the injecting via the second port injector away from the intake valve, estimating the actual water amount via the exhaust oxygen sensor; following the injecting via the manifold injector, estimating the actual water amount via one of the manifold temperature sensor, intake humidity sensor, and the intake oxygen sensor; and following the injecting via the direct injector, estimating the actual water amount via one of the intake oxygen sensor and the exhaust oxygen sensor. Further, estimating via the intake oxygen sensor following the injecting via the manifold injector may include operating the intake oxygen sensor in a nominal mode at a first reference voltage, and estimating via the intake oxygen sensor following the injecting via the direct injector includes operating the intake oxygen sensor in a variable mode at each of the first reference voltage and a second reference voltage, higher than the first reference voltage, and estimating via the exhaust oxygen sensor includes operating the exhaust oxygen sensor in the variable mode at each of the first reference voltage and the second reference voltage. Adjusting engine operation may include, as the commanded amount exceeds the actual amount, increasing an EGR flow, retarding spark timing from a nominal timing, and advancing or retarding variable cam timing from a nominal cam timing.

In this way, water injection and/or engine operating parameters may be adjusted in order to achieve a desired dilution demand or cooling benefit.

In FIG. 4, graph 400 illustrates example adjustments to water injection based on engine operating conditions. Graph 400 illustrates selecting a water injector of a water injection system (such as water injection system 60 shown in FIG. 1), to deliver an amount of water that provides charge cooling or charge dilution benefits. Further, the graph illustrates sensing the water injection based on manifold charge temperature sensor output, and adjusting engine operating parameters, such as spark timing, following a water injection. Specifically, graph 400 shows a commanded amount of water injected via a selected water injector at 402-404, engine knock (e.g., knock output of one or more knock sensors) at plot 406, engine dilution demand at plot 408, changes in an output of a manifold charge temperature sensor at plot 410, changes in an output of an exhaust UEGO sensor at plot 412, and an estimated amount of injected water at plot 414 (as sensed based on the output of the MCT sensor). Water injection via a manifold water injector is shown via a dashed line at plot 402; a dotted line corresponds to water injection via port water injectors angled toward the intake manifold (plot 404), and a solid line corresponds to water injection via port water injectors angled into intake valves (plot 406). For each operating parameter, time is depicted along the horizontal axis and values of each respective operating parameter are depicted along the vertical axis. In one example, the manifold charge temperature sensor may be positioned proximate to the water injector, such as within the intake manifold when the water injector is positioned in the intake manifold.

Prior to time t1, water injection conditions are not met and water injection is not enabled. During this time, the engine is operating without water injection. In one example at time t1, water may not be available for injection. As a result, the controller may send a request to actuators of a water collection system to increase water collection on-board the vehicle. In another example, water injection may not be requested due to engine load and spark timing retard being less than a threshold.

Knock signal intensity increases (plot 406) above threshold 405 prior to time t1 due to a change in engine operating conditions. In one example, knock signal may increase in response to increase in engine speed and/or load, such as due to a rise in engine load to mid-high load conditions. In one example, the rise in load is due to an operator pedal tip-in event. In response to the indication of knock, water injection is requested at time t1. At time t1, the controller may send a signal to a manifold water injector (402) to inject an amount of water required to provide knock relief into the manifold. The amount of water that is commanded to be injected via the manifold water injector (plot 402) in based on the indication of knock.

In response to the injection request, the manifold charge temperature may be measured (before the water injection) and the controller may command the determined amount of water to be injected from the manifold injector (plot 402) of the water injection system at time t1 by sending a pulse-width signal to the injector. As a result of the manifold water injection, charge cooling occurs, and the manifold charge temperature decreases between time t1 to t2 (plot 406). After a duration following injection, at t2, manifold charge temperature is measured again. The measured change in MCT, however, is less than the actual change expected (dashed segment 409) based on the commanded water injection amount. As a result, a water injection error (injection deficit) is learned and applied during a subsequent water injection event. Due to the water deficit, the amount of charge cooling required for knock relief is not provided. As a result, at t2, knock signal (plot 406) does not decrease below threshold 405, where the threshold 405 is a knock signal intensity above which water injection is requested. In response to knock intensity remaining above the threshold, manifold water injection is reinitiated with the manifold water injection amount increased to compensate for the water injection error learned during the preceding injection. Due to insufficient knock relief with the added manifold water injection, at t3, manifold injection is provided at a maximum rate, and a further amount of knock relief is provided by the controller commanding a further amount of water to be injected from port injectors that are angled away from the intake valves (plot 403). In an alternate example, the controller may send a signal to an actuator of a direct water injector coupled to the knock affected cylinder(s) to inject the amount of water for added knock relief at t3. As water injection is used for charge cooling, the MCT continues to drop, and knock relief is achieved.

After a duration following injection at t3, manifold charge temperature is measured again and the amount of water injected (plot 414) is estimated at time t4 from the measured change in manifold charge temperature. No water injection error is learned and therefore water injection is not further adjusted. As a result of water injection at t3, manifold charge temperature decreases at t4 and knock signal (plot 406) decreases below the threshold. In response to knock intensity below the threshold, the controller decreases the amount of water injected between time t4 and t5.

At t5, dilution demand increases above a threshold 407 due to a change in engine operating conditions, such as due to a drop in engine load to low-mid load conditions. In one example, the drop in load is due to an operator pedal tip-out event. The threshold 407 is a dilution demand above which water injection is requested. In response to the dilution demand rising above the threshold at time t5, and due to the valve surface temperatures being sufficiently hot, the controller commands an amount of water to be injected via port injectors (plot 404) that are angled towards intake valves. The controller may receive an output from the UEGO sensor operating in the variable voltage mode before commanding the water injection. The controller may then send a signal to actuators of the corresponding port water injectors and inject an amount of water based on the desired dilution demand. The controller may receive another output from the UEGO sensor operating in the variable voltage mode after the water injection, at time t6. The measured change in UEGO output, however, is less than the actual change expected (dashed segment 411) based on the commanded water injection amount. As a result, a water injection error (injection deficit) is learned and applied during a subsequent water injection event, at t6, to better meet the dilution demand. In particular, port injection towards a closed intake valve is increased during the subsequent water injection at t6. In response to a decrease in dilution demand following the water injection, the controller may adjust an amount of water injected at time t7. For example, the controller may decrease the amount of water injected based on the decrease in dilution demand at time t7.

Another example water injection adjustment and water sensing is shown with reference to FIG. 7. In the example of FIG. 7, water injection is used for dilution control. Graph 700 depicts engine load at plot 702, port water injection at plot 704, manifold water injection at plot 706, the output of an intake oxygen sensor (IAO2 signal) at plot 708, the output of an exhaust oxygen sensor (UEGO) at plot 710, the operating mode (nominal or variable voltage) of the UEGO sensor at plot 711 (dashed line), the output of an intake humidity sensor at plot 712, the output of a manifold charge temperature sensor (MCT) at plot 714, and the temperature of an intake valve positioned downstream of the port injector at plot 716. For each operating parameter, time is depicted along the horizontal axis and values of each respective operating parameter are depicted along the vertical axis. In one example, the manifold charge temperature sensor may be positioned proximate to the water injector, such as within the intake manifold when the water injector is positioned in the intake manifold. In addition, the humidity sensor, the IAO2 sensor, and the MCT sensor may all be coupled to the intake manifold, upstream of the port injector. In the present example, the port injector may be configured to inject water towards the intake valve.

Prior to t1, the engine is operating at idle conditions and no water injection is required. Accordingly, both the port water injector and the manifold water injector are maintained disabled and no water is injected into the intake manifold. Intake manifold temperature conditions are reflected at this time by the output of the MCT sensor, and intake manifold humidity conditions are reflected at this time by the output of the humidity sensor. Both the IAO2 and the UEGO are operated in the nominal mode at this time. The IAO2 sensor output in the nominal mode provides an estimate of the oxygen content of the intake charge at this time. The UEGO sensor output in the nominal mode provides an estimate of the oxygen content of the exhaust at this time, which is used to infer the exhaust air-fuel ratio. In the present example, the UEGO sensor output indicates that the engine is operating at or around stoichiometry. Also, during this time, the intake valve temperature may be slowly rising.

At t1, due to a change in engine operating conditions, such as an increase in torque demand, the engine is moved to a low speed-load region. In this region, the engine may be combustion stability limited and may require more engine dilution. Water injection may be enabled at this time to provide the desired engine dilution. In particular, port water injection is given a higher priority (over manifold water injection) at this time due to the intake valve being sufficiently hot, and also due to engine design reasons (such as due to proximity of the port injector to the water pump).

Between t1 and t2, water is port injected from the port water injector onto the hot surface of the intake valve. In particular, a timing of the port water injection is adjusted to coincide with intake valve closing (such as near BDC of an intake stroke, as discussed with reference to FIG. 6) so that the injected water can rapidly evaporate (e.g., right upon touching the hot surface of the intake valve), thereby enhancing the charge dilution effects of the water injection while minimizing the charge cooling effect. The amount of water injected is adjusted to meet the dilution demand. Between t1 and t2, due to the water injection, a temperature of the intake valve starts to drop. Also between t1 and t2, the amount of water injected is sensed via one or more of the IAO2 and the UEGO sensors operating in the variable voltage mode. In the variable voltage mode, the higher reference voltage causes the injected water to be broken into hydrogen and oxygen, thereby increasing the amount of oxygen sensed by the oxygen sensor. The extra oxygen content can then be correlated to the amount of water received in the intake manifold due to the port water injection. It will be appreciated that if the IAO2 sensor were operated in the nominal mode, the output of the sensor may not have reliably indicated the manifold water concentration due to the location of the port water injection relative to the location of the IAO2 sensor. Likewise, if the UEGO sensor were operated in the nominal mode, the output of the sensor may not have reliably indicated the manifold water concentration due to the engine controller maintaining the exhaust air-fuel ratio remaining at or around stoichiometry during the water injection. The output of the humidity sensor may also be relatively unreliable at this time based on the location of the port water injection relative to the location of the humidity sensor. In addition, since the port water injection was performed onto the closed hot intake valve surface to reduce the charge cooling effect of the water injection, the output of the MCT sensor may also be unreliable at this time.

At t2, responsive to an operator torque demand, there is a further increase in engine load to a low-mid load region. There is a corresponding increase in the engine dilution demand. Due to the lower intake valve temperature, port water injection cannot be used at this time for providing the dilution demand. Therefore port water injection is disabled and manifold water injection is enabled at this time to provide the desired engine dilution.

Between t2 and t3, water is injected from the manifold water injector into the intake manifold or onto the manifold surface. The amount of water injected is adjusted to meet the dilution demand (which gradually increases between t2 and t3). Between t2 and t3, due to the increased engine load, a temperature of the intake valve starts to rise. Between t2 and t3, the amount of water injected is sensed via one or more of the IAO2 and the UEGO sensors operating in the variable voltage mode (VVs, dashed plot 711). In the variable voltage mode, the higher reference voltage causes the injected water to be broken into hydrogen and oxygen, thereby increasing the amount of oxygen sensed by the oxygen sensor. The extra oxygen content can then be correlated to the amount of water received in the intake manifold due to the manifold water injection. It will be appreciated that if the UEGO sensor were operated in the nominal mode (nom, dashed plot 711), the output of the sensor may not have reliably indicated the manifold water concentration due to the engine controller maintaining the exhaust air-fuel ratio remaining at or around stoichiometry during the water injection. The IAO2 sensor may alternatively be operated in the nominal mode (not shown) and the output of the sensor may reliably indicate the manifold water concentration due to the location of the manifold water injection relative to the location of the IAO2 sensor. Likewise, the output of the humidity sensor may also be reliably used to estimate the water injection amount due to the location of the manifold water injection relative to the location of the humidity sensor. The output of the MCT sensor may also be reliable at this time.

At t3, there is a further increase in engine speed-load to a mid-load region and a corresponding further increase in engine dilution demand. This is provided by increasing the manifold water injection to a maximal rate and thereafter holding the manifold water injection at the maximal rate. The manifold water injector is at its saturation limit between t3 and t4.

The humidity estimate rises as the manifold water injection is increased. However once the manifold water injection reaches the saturation limit at t3, the humidity sensor may also become saturated and may be unable to reliably estimate the amount of water injected via the manifold water injector. Consequently the humidity sensor output may remain constant even as the amount of water injected by the manifold injector increases. The MCT sensor may also become confounded by the presence of liquid water on the sensor during saturation conditions and the MCT measurement may not be trusted to be accurate. For example, the MCT output may bounce around and may not correlate with the water injection amount. Due to the intake manifold air becoming fully saturated with water, liquid water may penetrate the intake oxygen sensor protection tube. As a result, the output of the IAO2 sensor operating in the nominal mode may remain constant even as the water injection amount increases (see IAO2 signal depicted at dashed segment 709). Likewise, if the UEGO sensor is operated in the nominal mode, the output of the sensor may remain constant and may not reliably indicate the manifold water concentration due to the engine controller maintaining the exhaust air-fuel ratio remaining at or around stoichiometry during the water injection.

Therefore between t3 and t4, when the manifold water injection is at the saturation limit, the amount of water injected is reliably sensed via one or more of the IAO2 sensor operating in the variable voltage mode and the UEGO sensor operating in the variable voltage mode. At t3, when IAO2 sensor becomes saturated, which will be known when the sensor's pumping current becomes 0, the IAO2 may be operated in the VVs mode in order to dissociate the water in the protection tube surrounding the sensing element of the IAO2 sensor and obtain an accurate reading of the amount of water injected into the intake manifold. As such, the output of the UEGO sensor operating in the VVs mode may provide the most accurate estimate of the water injection amount during the saturated water injection conditions. In particular, the UEGO output may provide an estimate of a total amount of water that was injected into the intake air stream (for example, if water was injected via a combination of port and manifold water injection).

At t4, there may a drop in driver torque demand resulting in a corresponding drop in engine speed-load and drop in dilution demand. Therefore at t4, water injection may be disabled or reduced. Sensor outputs may correspondingly drop. After t4, the MCT sensor may resume providing an accurate estimate of the manifold temperature, the humidity sensor may resume providing an accurate estimate of the manifold humidity, the IAO2 sensor may resume being operated in the nominal mode to provide an accurate estimate of the intake air oxygen content, and the UEGO sensor may resume being operated in the nominal mode to provide an accurate estimate of the exhaust air-fuel ratio. In this way, water injector selections may be adjusted based on engine operating conditions, and water injection estimation modalities may be appropriately adjusted to enable an accurate estimation of the water injection amount.

Yet another example water injection adjustment and water sensing is shown with reference to FIG. 8. In the example of FIG. 8, water injection is used for knock control and/or engine component temperature control. Graph 800 depicts engine load at plot 802, port water injection at plot 804, manifold water injection at plot 806, direct water injection at plot 808, the output of an intake oxygen sensor (IAO2 signal) at plot 810, the operating mode (nominal or variable voltage) of the IAO2 sensor at plot 811 (dashed line), the output of an exhaust oxygen sensor (UEGO) at plot 812, the operating mode (nominal or variable voltage) of the UEGO sensor at plot 813 (dashed line), the output of an intake humidity sensor at plot 814, and the output of a manifold charge temperature sensor (MCT) at plot 816. For each operating parameter, time is depicted along the horizontal axis and values of each respective operating parameter are depicted along the vertical axis. In one example, the manifold charge temperature sensor may be positioned proximate to the water injector, such as within the intake manifold when the water injector is positioned in the intake manifold. In addition, the humidity sensor, the IAO2 sensor, and the MCT sensor may all be coupled to the intake manifold, upstream of the port injector. In the present example, the port injector may be configured to inject water away from the intake valve.

Prior to t11, the engine is operating at low engine speed-load conditions and no water injection is required. Accordingly, each of the port water injector, the manifold water injector, and the direct water injector are maintained disabled and no water is injected into the intake manifold or directly into the cylinder. Intake manifold temperature conditions are reflected at this time by the output of the MCT sensor, and intake manifold humidity conditions are reflected at this time by the output of the humidity sensor. Both the IAO2 and the UEGO are operated in the nominal mode at this time. The IAO2 sensor output in the nominal mode provides an estimate of the oxygen content of the intake charge at this time. The UEGO sensor output in the nominal mode provides an estimate of the oxygen content of the exhaust at this time, which is used to infer the exhaust air-fuel ratio. In the present example, the UEGO sensor output indicates that the engine is operating at or around stoichiometry.

Between t11 and t12, due to a change in engine operating conditions, such as an increase in torque demand, the engine is moved to a mid-high speed-load region. In this region, the engine may become knock limited and may require charge cooling. In particular, as the engine load increases, the engine may move closer to or beyond the knock limit, and the knock intensity of an engine knock sensor may start to just exceed the knock limit. Water injection may be enabled at this time to provide the desired charge cooling. In particular, port water injection is given a higher priority (over manifold water injection) at this time due to engine design reasons (such as due to proximity of the port injector to the water pump). Between t11 and t12, water is port injected from the port water injector in a direction away from the surface of the intake valve, and opposite to the direction of airflow into the engine (that, while air is being flowed from the intake manifold into the intake port and towards the intake valve, water may be port injected towards the intake port and manifold, and away from the intake valve). A timing of the port water injection is adjusted to coincide with a valve timing where the intake valve is almost fully open (such as before BDC of an intake stroke, or halfway between TDC and BDC of the intake stroke, as discussed with reference to FIG. 6) so that the injected water can be rapidly entrained in the air flowing towards the cylinder valve. In addition, a larger portion of the liquid water may be entrained into the air (instead of being vaporized at the intake port), thereby enhancing the charge cooling effects of the water injection while minimizing the charge dilution effect. The amount of water injected is adjusted to meet the charge cooling demand.

Between t11 and t12, due to the charge cooling effect of the port water injection, a temperature of the intake manifold starts to drop, as sensed by the MCT sensor. The output of the humidity sensor may also be reliable at this time based on the location of the port water injection relative to the location of the humidity sensor. That is, the output of the humidity sensor may correlate with the port water injection amount.

Also between t11 and t12, the amount of water injected is sensed via one or more of the IAO2 and the UEGO sensors operating in the variable voltage mode (VVs, dashed plot 813). In the variable voltage mode, the higher reference voltage causes the injected water to be broken into hydrogen and oxygen, thereby increasing the amount of oxygen sensed by the oxygen sensor. The extra oxygen content can then be correlated to the amount of water received in the intake manifold due to the port water injection. It will be appreciated that the IAO2 sensor may alternatively be operated in the nominal mode, as depicted (nom, dashed plot 811), and the output of the sensor may reliably indicate the manifold water concentration due to the location of the port water injection relative to the location of the IAO2 sensor. However, if the UEGO sensor were operated in the nominal mode, the output of the sensor may not have reliably indicated the manifold water concentration due to the engine controller maintaining the exhaust air-fuel ratio remaining at or around stoichiometry during the water injection.

At t12, responsive to an operator torque demand, there is a further increase in engine load to a higher speed-load region. There is a corresponding increase in the engine charge cooling demand due to a rise in knock intensity. At this time, port water injection cannot be used for providing the charge cooling demand. Therefore port water injection is disabled and manifold water injection is enabled at this time to provide the desired engine knock relief.

Between t12 and t13, water is injected from the manifold water injector into the intake manifold or onto the manifold surface. The amount of water injected is adjusted to meet the charge cooling demand (which gradually increases between t12 and t13 as the knock intensity increases). Between t12 and t13, the amount of water injected continues to be sensed via one or more of the IAO2 (operating in the nominal or variable voltage mode) and the UEGO sensor (operating in the variable voltage mode). In the variable voltage mode, the higher reference voltage causes the injected water to be broken into hydrogen and oxygen, thereby increasing the amount of oxygen sensed by the oxygen sensor. The extra oxygen content can then be correlated to the amount of water received in the intake manifold due to the manifold water injection. Likewise, the output of the humidity sensor may also be reliably used to estimate the water injection amount due to the location of the manifold water injection relative to the location of the humidity sensor. The output of the MCT sensor may also be reliable at this time.

At t13, there is a further increase in engine speed-load and a corresponding further increase in engine charge cooling demand. This is provided by increasing the manifold water injection to a maximal rate and thereafter holding the manifold water injection at the maximal rate. The manifold water injector reaches its saturation limit between t13 and t14.

At t14, there is another increase in engine speed-load and a corresponding further increase in engine charge cooling demand for component temperature control and knock relief. This is provided by maintaining the manifold water injection at the maximal rate and increasing injection of water into the cylinder via a direct water injector. The direct water injection amount of adjusted between t14 and t15 as the engine speed-load changes, and the corresponding charge cooling demand changes.

The humidity estimate rises as the manifold water injection is increased. However once the manifold water injection reaches the saturation limit after t13, the humidity sensor may also become saturated and may be unable to reliably estimate the amount of water injected via the manifold water injector. Consequently the humidity sensor output may remain constant even as the amount of water injected by the manifold injector increases between t13 and t14, and even as water is direct injected after t14. The MCT sensor may also become confounded by the presence of liquid water on the sensor during saturation conditions (t13-t15) and the MCT measurement may not be trusted to be accurate. For example, the MCT output may bounce around and may not correlate with the water injection amount. Due to the intake manifold air becoming fully saturated with water, liquid water may penetrate the intake oxygen sensor protection tube. As a result, the output of the IAO2 sensor operating in the nominal mode may remain constant even as the water injection amount increases (see IAO2 signal depicted at dashed segment 809). Likewise, if the UEGO sensor is operated in the nominal mode, the output of the sensor may remain constant and may not reliably indicate the manifold water concentration due to the engine controller maintaining the exhaust air-fuel ratio remaining at or around stoichiometry during the water injection.

Therefore between t13 and t15, when the manifold water injection is at the saturation limit, and while direct injection of water is varied, the amount of water injected is reliably sensed via one or more of the IAO2 sensor operating in the variable voltage mode and the UEGO sensor operating in the variable voltage mode. At t13, when IAO2 sensor becomes saturated, which will be known when the sensor's pumping current becomes 0, the IAO2 may be operated in the VVs mode in order to dissociate the water in the protection tube surrounding the sensing element of the IAO2 sensor and obtain an accurate reading of the amount of water injected into the intake manifold. As such, the output of the UEGO sensor operating in the VVs mode may provide the most accurate estimate of the water injection amount during the saturated water injection conditions. In particular, the UEGO output may provide an estimate of a total amount of water that was injected into the intake air stream (for example, the total amount of water that was injected via a combination of manifold and direct water injection).

At t15, there is a drop in driver torque demand resulting in a corresponding drop in engine speed-load and drop in charge cooling demand. Therefore at t15, water injection may be disabled or reduced. Sensor outputs may correspondingly drop. After t15, the MCT sensor may resume providing an accurate estimate of the manifold temperature, the humidity sensor may resume providing an accurate estimate of the manifold humidity, the IAO2 sensor may resume being operated in the nominal mode to provide an accurate estimate of the intake air oxygen content, and the UEGO sensor may resume being operated in the nominal mode to provide an accurate estimate of the exhaust air-fuel ratio. In this way, water injector selections may be adjusted based on engine operating conditions, and water injection estimation modalities may be appropriately adjusted to enable an accurate estimation of the water injection amount.

In this way, water injection sensing may be adjusted based on the injector selected for water injection as well as the specific benefits being leveraged via the water injection. By relying on a temperature based water injection control (such as via a charge temperature sensor) when water injection is used at high loads for knock relief, the charge cooling effect of the water injection may be accurately measured and compensated for. By relying on a humidity or oxygen content based water injection control (such as via an intake humidity or oxygen sensor) when water injection is used at low loads for charge dilution, the charge diluting effect of the water injection may be accurately measured and compensated for. By adjusting water injection and engine operating parameters based on a sensed water injection error, water injection benefits, and associated fuel economy benefits, may be extended over a wider range of engine operating conditions. By injecting water via port water injectors onto a hot surface of a closed intake valve when an engine dilution demand is present, the rapid evaporation of water may be advantageously used to maximize charge dilution effects of the water injection while minimizing charge cooling effects. By injecting water via port water injectors away from an open intake valve when an engine cooling demand is present, the improved mixing of the injected water with the oncoming air flow may be advantageously used to maximize charge cooling effects of the water injection while minimizing charge dilution effects. By relying on an exhaust oxygen sensor operating in a variable voltage mode to sense a net water injection during conditions when other sensors are constrained, water injection estimation may be accurately and reliably performed. By improving water injection usage, engine performance may be improved.

As one embodiment, a method includes during a first condition, responsive to an engine dilution demand, port injecting water towards a closed intake valve; and during a second condition, responsive to engine knock, port injecting water away from an open intake valve. In a first example of the method, the method further includes wherein port injecting water towards a closed intake valve includes injecting water onto a valve surface at a timing before initiation of intake valve opening, and port injecting water away from an open intake valve includes injecting away from the valve surface at a timing after initiation of intake valve opening. A second example of the method optionally includes the first example and further includes wherein the first condition includes engine load being lower than a threshold, and wherein the second condition includes the engine load being higher than the threshold. A third example of the method optionally includes one or more of the first and second examples, and further includes wherein port injecting water towards the closed intake valve includes port injecting at bottom dead center (BDC) of an intake stroke, and wherein port injecting water away from the open intake valve includes port injecting in between top dead center (TDC) and BDC of the intake stroke. A fourth example of the method optionally includes one or more of the first through third examples, and further includes wherein a temperature of the intake valve is higher during the first condition relative to the second condition. A fifth example of the method optionally includes the first through fourth examples, and further includes wherein a larger portion of the injected water remains in liquid form following the injecting during the second condition relative to the first condition. A sixth example of the method optionally includes the first through fifth examples, and further includes wherein airflow into a runner coupled upstream of the intake valve is higher during the second condition relative to the first condition. A seventh example of the method optionally includes the first through sixth examples, and further includes wherein an amount of water commanded during the first condition is based on each of engine load and modeled valve temperature; and wherein the amount of water commanded during the second condition is based on each of engine load and estimated knock intensity. An eighth example of the method optionally includes the first through seventh examples, and further includes wherein the timing of port injecting water towards the closed intake valve is based on the modeled valve temperature, the timing delayed until the modeled valve temperature exceeds a threshold temperature, the threshold temperature based on the amount of water injected during the first condition. A ninth example of the method optionally includes the first through eighth examples, and further comprises, during the first condition, after the injecting, estimating the actual amount of water in the engine based on feedback from an intake oxygen sensor operating in a variable voltage mode; and during the second condition, after the injecting, estimating an actual amount of water in the engine based on feedback from a manifold charge temperature sensor. A tenth example of the method optionally includes the first through ninth examples, and further comprises, during the first condition, after the injecting, adjusting an EGR valve opening based on a difference between the commanded amount and the actual amount, the EGR valve opening increased as the difference increases; and during the second condition, after the injecting, adjusting spark timing retard based on the difference between the commanded amount and the actual amount, spark timing retarded further as the difference increases.

As another embodiment, a method comprises responsive to engine dilution demand, port injecting a first amount of water towards an intake valve before intake valve opening; and responsive to engine charge cooling demand, port injecting a second amount of water away from the intake valve during intake valve opening. In a first example of the method, the method further comprises, after port injecting responsive to the engine dilution demand, estimating a change in intake oxygen via an intake oxygen sensor operating in a variable voltage mode, and adjusting an EGR flow rate based on the estimated change in intake oxygen. A second example of the method optionally includes the first example and further comprises, after port injecting responsive to the charge cooling demand, estimating a change in manifold temperature via a manifold temperature sensor, and adjusting a degree of spark timing retard applied based on the estimated change in manifold temperature. A third example of the method optionally includes one or more of the first and second examples, and further includes wherein each of an amount and timing of the port injecting responsive to engine dilution demand is based on modeled valve temperature and wherein each of the amount and timing of the port injecting responsive to charge cooling demand is based on knock intensity.

As yet another embodiment, a system includes a port water injector coupled to an intake port of an engine cylinder, upstream of an intake valve of the cylinder; a manifold water injector coupled to an engine intake manifold, upstream of the port water injector; a direct water injector coupled to the cylinder; an exhaust oxygen sensor coupled to an engine exhaust manifold; a manifold charge temperature sensor and an intake oxygen sensor coupled to the intake manifold, downstream of the manifold water injector; an EGR passage with an EGR valve for recirculating exhaust gas from the exhaust manifold to the intake manifold; and a controller including non-transitory memory with computer readable instructions for: selecting one of the manifold water injector and the port water injector for injecting a first amount of water responsive to an engine dilution demand, the selecting based on intake valve temperature; and selecting one or more of the manifold water injector, the direct water injector, and the port injector for injecting a second amount of water for engine knock control, the selecting based on an injection limit of the manifold water injector and an estimated cylinder-to-cylinder water imbalance. In a first example of the system, the system further includes wherein the selecting one of the manifold water injector and the port water injector includes selecting the manifold water injector when the intake valve temperature is lower and selecting the port water injector when the intake valve temperature is higher, the intake valve temperature modeled based on engine load. A second example of the system optionally includes the first example and further includes wherein the selecting one or more of the manifold water injector, the port injector, and the direct water injector includes selecting only the manifold water injector when the manifold water injector is within the injection limit and the imbalance is less than a threshold, selecting each of the manifold water injector and the direct injector when the manifold water injector is at or above the injection limit and the imbalance is less than the threshold, and selecting the port injector when the imbalance is more than the threshold. A third example of the system optionally includes one or more of the first and second examples, and further includes wherein selecting the port injector for engine dilution demand includes injecting the first amount of water via the port injector towards the intake valve while the intake valve is closed, and wherein selecting the port injector for engine knock control includes injecting the second amount of water via the port injector away from the intake valve while the intake valve is open. A fourth example of the system optionally includes one or more of the first through third examples, and further comprises, after injecting the first or the second amount of water, estimating an actual amount of water received in the engine, and adjusting an opening of the EGR valve based on a deviation of the actual amount from the first or second amount, wherein the estimating includes: estimating based on input from the exhaust oxygen sensor operating in a variable voltage mode when the port injector is selected; estimating based on input from the manifold charge temperature sensor when the manifold injector is selected; and estimating based on input from each of the intake oxygen sensor and the exhaust oxygen sensor, each operating in the variable voltage mode, when the direct injector is selected.

In a further representation, a method for an engine comprises: responsive to water injection into an intake manifold via a port water injector, adjusting engine operation based on output from an exhaust oxygen sensor; and responsive to water injection into the intake manifold via a manifold water injector, adjusting engine operation based on output from one or more of an intake oxygen sensor, an intake humidity sensor, and a manifold charge temperature sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during a first condition, responsive to an engine dilution demand, port injecting water towards a closed intake valve; and
during a second condition, responsive to engine knock, port injecting water away from an open intake valve, wherein a larger portion of the injected water remains in liquid form following the injecting during the second condition relative to the first condition.

2. The method of claim 1, wherein port injecting water towards the closed intake valve includes injecting water onto a valve surface at a timing before initiation of intake valve opening, and port injecting water away from the open intake valve includes injecting water away from the valve surface at a timing after initiation of intake valve opening.

3. The method of claim 1, wherein the first condition includes engine load being lower than a threshold, and wherein the second condition includes the engine load being higher than the threshold.

4. The method of claim 1, wherein port injecting water towards the closed intake valve includes port injecting at bottom dead center (BDC) of an intake stroke, and wherein port injecting water away from the open intake valve includes port injecting in between top dead center (TDC) and BDC of the intake stroke.

5. The method of claim 1, wherein a temperature of the intake valve is higher during the first condition relative to the second condition.

6. The method of claim 1, wherein airflow into a runner coupled upstream of the intake valve is higher during the second condition relative to the first condition.

7. The method of claim 1, wherein an amount of water commanded during the first condition is based on each of engine load and modeled valve temperature, and wherein the amount of water commanded during the second condition is based on each of engine load and estimated knock intensity.

8. The method of claim 7, wherein timing of port injecting water towards the closed intake valve is based on the modeled valve temperature, the timing delayed until the modeled valve temperature exceeds a threshold temperature, the threshold temperature based on the amount of water injected during the first condition.

9. The method of claim 7, further comprising, during the first condition, after the injecting, estimating an actual amount of water vapor in an intake manifold based on feedback from an intake oxygen sensor operating in a variable voltage mode; and, during the second condition, after the injecting, estimating an actual amount of water in the engine based on feedback from a manifold charge temperature sensor.

10. The method of claim 9, further comprising, during the first condition, after the injecting, adjusting an EGR valve opening based on a difference between a commanded amount and the actual amount of water vapor, the EGR valve opening increased as the difference increases; and, during the second condition, after the injecting, adjusting spark timing retard based on a difference between a commanded amount and the actual amount of water, spark timing retarded further as the difference increases.

11. A method for an engine, comprising:
responsive to engine dilution demand, port injecting a first amount of water towards an intake valve before intake valve opening; and
responsive to engine charge cooling demand, port injecting a second amount of water away from the intake valve during intake valve opening,
wherein each of an amount and timing of the port injecting responsive to engine dilution demand is based on modeled valve temperature and wherein each of the amount and timing of the port injecting responsive to charge cooling demand is based on knock intensity.

12. The method of claim 11, further comprising, after port injecting responsive to the engine dilution demand, estimating a change in intake oxygen via an intake oxygen sensor operating in a variable voltage mode, and adjusting an EGR flow rate based on the estimated change in intake oxygen.

13. The method of claim 11, further comprising, after port injecting responsive to the charge cooling demand, estimating a change in manifold temperature via a manifold temperature sensor, and adjusting a degree of spark timing retard applied based on the estimated change in manifold temperature.

14. A method for an engine, comprising:
during a first condition, responsive to an engine dilution demand, port injecting water towards a closed intake valve; and
during a second condition, responsive to engine knock, port injecting water away from an open intake valve, wherein a temperature of the intake valve is higher during the first condition relative to the second condition.

15. The method of claim 14, further comprising, after injecting the water towards the closed intake valve during the first condition, estimating an actual amount of water received in the engine, and adjusting an opening of an EGR valve based on a deviation of the actual amount of water:
estimating based on input from an exhaust oxygen sensor operating in a variable voltage mode when a port water injector is selected.

16. The method of claim 14, wherein an amount of water commanded during the first condition is based on each of an engine load and a modeled valve temperature.

17. The method of claim 16 wherein timing of port injecting water towards the closed intake valve is based on the modeled valve temperature, the timing delayed until the modeled valve temperature exceeds a threshold temperature, the threshold temperature based on an amount of water injected during the first condition.

18. The method of claim 14, wherein an amount of water commanded during the second condition is based on each of an engine load and an estimated knock intensity.

* * * * *